United States Patent
Hong

(10) Patent No.: US 10,149,199 B2
(45) Date of Patent: Dec. 4, 2018

(54) METHOD FOR TRANSMITTING USER'S PLANE DATA IN SMALL CELL ENVIRONMENT AND APPARATUS THEREFOR

(71) Applicant: KT CORPORATION, Gyeonggi-do (KR)

(72) Inventor: Sung-pyo Hong, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 39 days.

(21) Appl. No.: 14/765,334

(22) PCT Filed: Jan. 13, 2014

(86) PCT No.: PCT/KR2014/000346
§ 371 (c)(1),
(2) Date: Aug. 1, 2015

(87) PCT Pub. No.: WO2014/119858
PCT Pub. Date: Aug. 7, 2014

(65) Prior Publication Data
US 2015/0373584 A1  Dec. 24, 2015

(30) Foreign Application Priority Data

Feb. 1, 2013  (KR) .................. 10-2013-0011913
Feb. 13, 2013 (KR) .................. 10-2013-0015296
Oct. 29, 2013  (KR) .................. 10-2013-0129015

(51) Int. Cl.
*H04L 5/00* (2006.01)
*H04W 28/08* (2009.01)
(Continued)

(52) U.S. Cl.
CPC .......... *H04W 28/08* (2013.01); *H04W 16/32* (2013.01); *H04W 72/04* (2013.01); *H04W 76/12* (2018.02);
(Continued)

(58) Field of Classification Search
None
See application file for complete search history.

(56) References Cited

U.S. PATENT DOCUMENTS

2011/0263256 A1  10/2011  Yavuz et al.
2011/0263260 A1  10/2011  Yavuz et al.
(Continued)

FOREIGN PATENT DOCUMENTS

KR   10-2012-0085838 A   8/2012
WO   2012/055114 A1   5/2012

OTHER PUBLICATIONS

3GPP TS 36.300 V11.4.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", Dec. 2012.

*Primary Examiner* — Sithu Ko
(74) *Attorney, Agent, or Firm* — IP Legal Services, LLC

(57) ABSTRACT

The present invention relates to a method for transmitting a user plane data in a small cell environment where a terminal is simultaneously connected to a macro cell and a small cell and an apparatus therefor, and more specifically a method for allowing a first base station to control the transmission of the user plane data of a terminal. The transmission includes based on at least one of load information and the measurement report information, determining the transmission of the user plane data by choosing a wireless bearer constructed through a second base station; transmitting a bearer establishment request message to a second base station; receiving (Continued)

a bearer establishment response message from the second base station; and transmitting an upper layer signaling containing at least one of cell identification information for the cell associated with the second base station, the cell index information of the second base station, and the data wireless bearer information constructed through the second base station to the terminal.

12 Claims, 18 Drawing Sheets

(51) Int. Cl.
*H04W 72/04* (2009.01)
*H04W 16/32* (2009.01)
*H04W 76/12* (2018.01)
*H04W 72/02* (2009.01)
*H04W 74/00* (2009.01)
*H04W 74/08* (2009.01)
*H04W 92/20* (2009.01)

(52) U.S. Cl.
CPC .......... *H04W 72/02* (2013.01); *H04W 74/002* (2013.01); *H04W 74/0833* (2013.01); *H04W 92/20* (2013.01)

(56) References Cited

U.S. PATENT DOCUMENTS

| | | |
|---|---|---|
| 2012/0015657 A1 | 1/2012 | Comsa et al. |
| 2012/0149362 A1 | 6/2012 | Tooher et al. |
| 2013/0210384 A1 | 8/2013 | Zhang |
| 2014/0092866 A1* | 4/2014 | Teyeb ................ H04W 76/045 370/331 |
| 2014/0204771 A1* | 7/2014 | Gao ...................... H04W 36/28 370/252 |

\* cited by examiner

METHOD FOR TRANSMITTING USER'S PLANE DATA IN SMALL CELL ENVIRONMENT AND APPARATUS THEREFOR

CROSS REFERENCE TO RELATED APPLICATIONS

This application is a National Stage Patent Application of PCT International Patent Application No. PCT/KR2014/000346 (filed on Jan. 13, 2014) under 35 U.S.C. § 371, which claims priority to Korean Patent Application Nos. 10-2013-0011913 (filed on Feb. 1, 2013), 10-2013-0015296 (filed on Feb. 13, 2013), and 10-2013-0129015 (filed on Oct. 29, 2013), the teachings of which are incorporated herein in their entireties by reference.

TECHNICAL FIELD

The present invention relates to a method and an apparatus for transmitting user plane data in a small cell environment where a user equipment is simultaneously connected to both a macro cell and a small cell.

BACKGROUND ART

With the progress in communication systems, consumers such as companies and individuals have used a wide variety of wireless terminals.

Current mobile communication systems affiliated with Third Generation Partnership Project (3GPP), for example, Long Term Evolution (LTE), LTE-Advanced (LTE-A), and the like, require a high-speed and high-capacity communication system capable of transmitting and receiving various data, such as image and music data, program data, and the like, beyond providing voice-oriented services.

For a high-speed and high-capacity communication system, technology capable of increasing the capacity of a user equipment by using a small cell is required.

Also, in an environment where a macro cell base station is connected to a small cell base station via a non-ideal backhaul, it is required to establish a small cell and a radio bearer in order to allow a user equipment to transmit user plane data through the small cell.

In this case, the macro cell base station and the user equipment are required to perform establishment procedures, such as addition/modification of a small cell, addition/modification of a radio bearer which is to be configured in a base station providing a small cell, and the like.

DETAILED DESCRIPTION OF THE INVENTION

Technical Problem

According to the requirements, an aspect of the present invention is to propose a method and an apparatus in which a user equipment adds/modifies a small cell and/or a data radio bearer in order to transmit user plane data in a small cell environment.

Also, another aspect of the present invention is to propose a method and an apparatus in which a first base station controls a procedure, such as a procedure for adding/modifying a small cell by a user equipment, a procedure for adding/modifying a radio bearer, which is to be configured in a small cell, by the user equipment, and/or the like.

Technical Solution

In order to solve the above-mentioned technical problems and in accordance with one aspect of the present invention, there is provided a method in which a first Base Station (BS) controls transmission of user plane data by a User Equipment (UE). The method includes selecting a radio bearer configured through a second BS based on at least one of load information of the first BS and measurement report information, and determining the transmission of the user plane data. The method includes transmitting a bearer establishment request message to the second BS, and receiving a bearer establishment response message from the second BS. The method also includes transmitting to the UE higher layer signaling including at least one of cell IDentifier (ID) information of a cell associated with the second BS, second BS cell index information, and Data Radio Bearer (DRB) information configured through the second BS.

Also, in accordance with another aspect of the present invention, there is provided a method in which a User Equipment (UE) controls transmission of user plane data. The method includes receiving from the first Base Station (BS) higher layer signaling including at least one of cell IDentifier (ID) information of a cell associated with the second BS, second BS cell index information, and Data Radio Bearer (DRB) information configured through the second BS. The method includes adding or modifying the cell associated with the second BS and configuring a DRB for transmitting the user plane data, based on the higher layer signaling.

Also, in accordance with still another aspect of the present invention, there is provided a Base Station (BS) system in a first BS for controlling transmission of user plane data by a User Equipment (UE). The BS system includes a control unit for selecting a radio bearer configured through a second BS based on at least one of load information of the first BS and measurement report information, and determining the transmission of the user plane data. The system includes a transmission unit for transmitting a bearer establishment request message to the second BS, and a reception unit for receiving a bearer establishment response message from the second BS. The transmission unit may further transmit to the UE higher layer signaling including at least one of cell IDentifier (ID) information of a cell associated with the second BS, second BS cell index information, and Data Radio Bearer (DRB) information configured through the second BS.

Further, in accordance with yet another aspect of the present invention, there is provided a User Equipment (UE) apparatus for controlling transmission of user plane data. The UE apparatus includes a reception unit for receiving, from the first Base Station (BS), higher layer signaling including at least one of cell IDentifier (ID) information of a cell associated with the second BS, second BS cell index information, and Data Radio Bearer (DRB) information configured through the second BS. The UE apparatus also includes a control unit for adding or modifying the cell associated with the second BS and configuring a DRB for transmitting the user plane data, based on the higher layer signaling.

Advantageous Effects

When the present invention is applied, the method and the apparatus are provided in which a user equipment adds/modifies a small cell and/or a data radio bearer in order to transmit user plane data through a small cell base station.

Also, when the present invention is applied, the method and the apparatus are provided in which a macro cell base station controls a procedure, such as a procedure for adding/modifying a small cell by a user equipment, a procedure for adding/modifying a radio bearer, which is to be configured in the small cell, by the user equipment, and/or the like.

MODE FOR CARRYING OUT THE INVENTIONS

Figure 1:
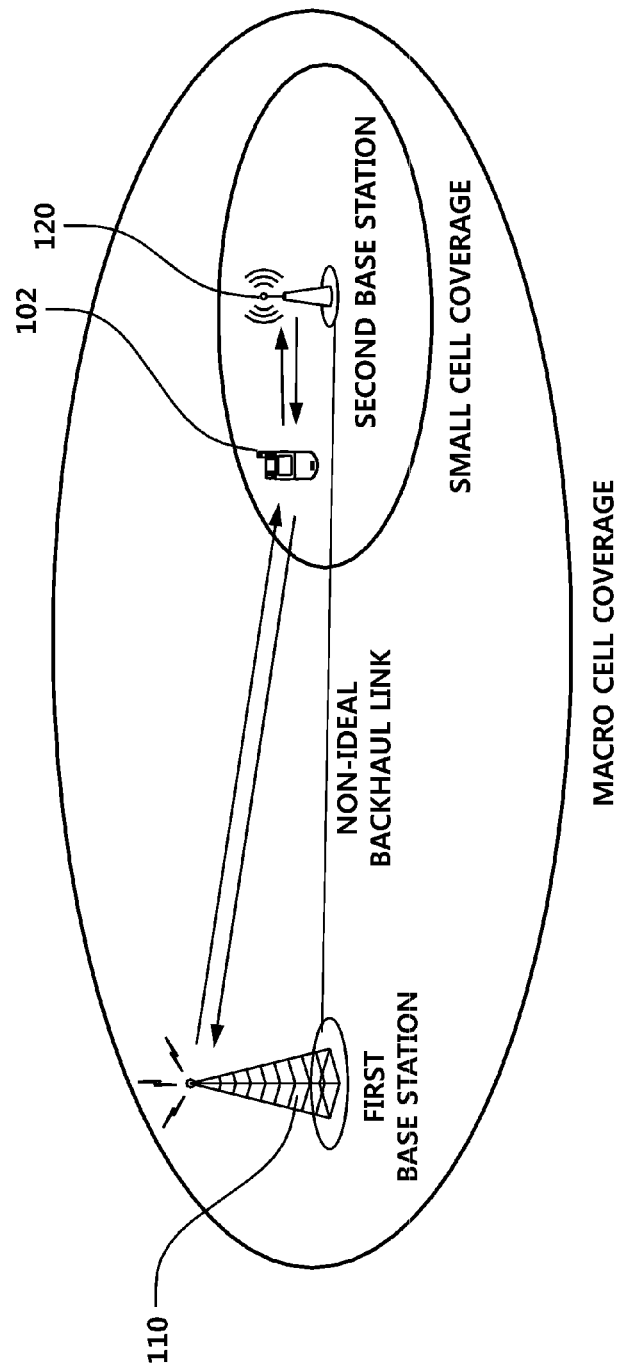
FIG. 1 is a view illustrating an example of a network configuration scenario, to which the present invention may be applied.

Hereinafter, embodiments of the present invention will be described with reference to the exemplary drawings. Further, in the following description of the present invention, a detailed description of known functions and configurations described herein may be omitted for brevity.

In embodiments of the present invention, the wireless communication system may be widely deployed so as to provide various communication services, such as voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in WCDMA and GSM, LTE, HSPA, and the like, and an MS (Mobile station), a UT (User Terminal), an SS (Subscriber Station), and a wireless device.

A base station or a cell may generally refer to a station capable of communicating with a User Equipment (UE). The base station may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be considered as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

In the specifications, the user equipment and the base station are used as two inclusive transceiving objects, for example, Uplink and Downlink, to embody the technology and technical concepts described in herein, and is not be limited to a predetermined term or word. Here, Uplink (UL) refers to a scheme for a UE to transmit and receive data to/from a base station, and Downlink (DL) refers to a scheme for a base station to transmit and receive data to/from a UE.

Multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present invention may be applicable to resource allocation in an asynchronous wireless communication scheme that is advanced through GSM, WCDMA, and HSPA, to be LTE and LTE-advanced, and may also be applicable to resource allocation in a synchronous wireless communication scheme that is advanced through CDMA and CDMA-2000 under UMB. The present invention is not be limited to a specific wireless communication technology field, and may include all technical fields to which the technical idea of the present invention may be applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-Advanced, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PHICH (Physical Hybrid ARQ Indicator CHannel), a PUCCH (Physical Uplink Control CHannel), and the like, and may be configured as a data channel, such as a PDSCH (Physical Downlink Shared CHannel), a PUSCH (Physical Uplink Shared CHannel), and the like, in order to transmit data.

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system according to embodiments refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and UEs.

A multiple transmission/reception points (or a transmission/reception communication system) may be a base station or a macro cell (hereinafter, referred to as an 'eNB') and at least one RRH that is connected to an eNB through an optical cable or an optical fiber and is wired controlled, and has a high transmission power or a low transmission power within a macrocell.

Hereinafter, a downlink refers to communication or a communication path from a multiple transmission/reception points to a UE, and an uplink refers to communication or a communication path from a UE to multiple transmission/reception points. In a downlink, a transmitter may be a part of multiple transmission/reception points and a receiver may be a part of a UE. In an uplink, a transmitter may be a part of a UE and a receiver may be a part of multiple transmission/reception points.

Hereinafter, when a signal is transmitted and received through a PUCCH, a PUSCH, a PDCCH, a PDSCH, or the like may be described as "a PUCCH, a PUSCH, a PDCCH, or a PDSCH is transmitted or received".

An eNB executes downlink transmission to UEs. The eNB may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel [for example, a Physical Uplink Shared Channel (PUSCH)]. Hereinafter, transmission and reception of a signal through each channel will be described as transmission and reception of a corresponding channel. A small cell using a low-power node is considered as a means for coping with mobile traffic explosion. A low-power node refers to a node using lower transmission (Tx) power than that of a typical macro node.

Through Carrier Aggregation (hereinafter referred to as "CA") technology before 3rd Generation Partnership Project (3GPP) Release 11, a small cell was built by using low-power Remote Radio Head (RRH), which is geographically-distributed antennas within a macro cell coverage.

However, in order to apply CA technology, the macro cell and the RRH cell are built to be scheduled under the control of one BS. To this end, it is necessary to build an ideal backhaul between the macro cell BS and the RRH. The ideal backhaul refers to a backhaul having a very high throughput and a very short delay, such as a dedicated point-to-point connection using an optical line (optical fiber) and a Line-Of-Sight (LOS) microwave. In contrast, a non-ideal backhaul refers to a backhaul having relatively low throughput and a relatively long delay, such as a Digital Subscriber Line (xDSL) and a non-LOS microwave.

Through the CA technology, multiple serving cells may be aggregated in order to provide a service to the UE. Specifically, the multiple serving cells may be configured for the UE in a Radio Resource Control (RRC)-connected state, and the macro cell and the RRH cell may be configured together as a serving cell and may provide a service to the UE, when the ideal backhaul is built between the macro cell BS and the RRH.

When the CA technology is configured, the UE may have only one RRC connection to a network.

RRC Connection

Establishment/re-establishment/one serving cell provides Non Access Stratum (NAS) mobility information (e.g., a Tracking Area Identity (TAI)) during a handover, and RRC connection re-establishment/one serving cell provides a security input during a handover. Such a cell is referred to as a "PCell (Primary Cell)." The PCell may be changed according to only a handover procedure.

According to UE capabilities, Secondary Cells (SCells) and a PCell may be configured together as a serving cell. The addition and removal of SCells are performed by RRC. When new SCells are added, dedicated RRC signaling is used to transmit all required system information of the SCells. Specifically, in a connected mode, the UE does not need to acquire system information directly broadcasted by SCells.

A single BS, which processes a PCell and SCells, affects only a Medium Access Control (MAC) layer although the one BS may have different carriers (e.g., a Downlink/Uplink Primary Component Carrier (DL/UL PCC) and a Downlink/Uplink Secondary Component Carrier (DL/UL SCC)) in a physical layer. With respect to Radio Link Control (hereinafter referred to as "RLC")/Packet Data Convergence Protocol (hereinafter referred to as "PDCP") layers of Layer 2 above the MAC layer, the single BS does not affect the RLC layer and the PDCP layer before introducing the CA technology. Specifically, a CA operation may not be distinguished in the RLC layer and the PDCP layer.

By using another method for building a small cell, a complementary low-power node (e.g., a pico node) may be built under the coverage of the existing macro BS layer regardless of the configuration of the CA technology. Specifically, another method for building a small cell is a method for building a macro BS and a pico BS. As the building of a small cell increases in numbers, the number of handovers in such a heterogeneous network environment becomes larger than that in an environment of a network built only by macro BSs. Accordingly, an increase in potential radio link failures caused by signaling load and a handover may be brought to the network.

As described above, in the conventional mobile communication network, a macro cell and a small cell are required to be scheduled under the control of one BS in order to build the small cell by using the CA technology. Accordingly, it is problematic in that an ideal backhaul between the macro cell BS and the small cell BS must be built. This problem may cause high costs due to the backhaul and may become a factor that hinders the spread of a small cell.

Also, the building of a small cell having a pico BS may require more frequent handover than in the case of a network built only by macro cells. Therefore, the more frequent handover may cause problems, such as an increase in signaling load, an increase in handover failure, and the like.

In order to solve the above-mentioned problems, an objective of the present invention is to provide a procedure and a related apparatus required to efficiently offload user plane traffic to a small cell under the control of a macro cell in an environment where a non-ideal backhaul is built between the macro cell BS and the small cell BS in a mobile communication network.

Hereinafter, when a UE configures a dual connectivity, a BS will be described as a master BS or a first BS, which forms an RRC connection with the UE and provides a PCell that becomes a reference of a handover, or which terminates an S1-Mobility Management Entity (MME) and serves as a mobility anchor with respect to a core network. Specifically, the master BS or the first BS may be a BS that provides a macro cell, or a BS that provides any one small cell in a dual connectivity between small cells.

Meanwhile, in a dual connectivity environment, a BS, which is distinguished from the master BS and provides additional radio resources to the UE, is known as a secondary BS or a second BS.

The first BS (or the master BS) and the second BS (or the secondary BS) may each provide at least one cell to the UE, and may be connected to each other through an interface therebetween.

Also, a cell associated with the first BS may be described as a macro cell, and a cell associated with the second BS may be described as a small cell. However, in a small cell cluster scenario, even a cell associated with the first BS may be described as a small cell Further, for the convenience of understanding, a cell provided by the first BS (i.e., a cell associated with the first BS) will be described and explained as a macro cell, and a cell provided by the second BS (i.e., a cell associated with the second BS) will be described and explained as a small cell. In this regard, the present invention may be applied to the dual connectivity between small cells or the small cell cluster scenario.

The first BS 110 described in this specification may be used to mean the master BS, and the second BS 120 described in this specification may be used to mean the secondary BS.

Also, the term "secondary cell," "small cell," or "SCell" described in this specification refers to a cell associated with the second BS, and the term "master cell," "macro cell," or "PCell" described in this specification refers to a cell associated with the first BS.

FIG. 1 is a view illustrating an example of a network configuration scenario, to which the present invention may be applied.

Referring to FIG. 1, a UE 102 is located in a small cell coverage within a macro cell coverage. Specifically, the UE 102 may be simultaneously overlaid in the small cell coverage within the macro cell coverage. Here, the macro cell and small cell have different carrier frequencies, and a poor backhaul is built between a first BS 110 and a second BS 120.

In FIG. 1, the macro cell and the small cell are built through different BSs, and the first BS 110 and the second BS 120 have an interface therebetween.

In the scenario illustrated in FIG. 1, the UE 102 may transmit data through only the second BS 120 Specifically, the second BS 120 may operate as a stand-alone BS and may transmit control plane data. Accordingly, the UE 102 may establish one RRC connection with the second BS 120, and may establish one or more Signaling Radio Bearers (SRBs) with the second BS 120. Also, in order to transmit user plane data, the UE 102 may establish one or more Data Radio Bearers (DRBs) with the second BS 120.

In another method, in the scenario illustrated in FIG. 1, the UE 102 may transmit user plane data through the second BS 120 under the control of the first BS 110 (or through cooperation between the second BS and the first BS). Alternatively, the UE 102 may transmit user plane data through the second BS 120 under the control through the cooperation between the second BS 120 and the first BS 110.

Specifically, in order to transmit control plane data, the UE 102 may establish one RRC connection with the first BS 110 and may establish one or more SRBs with the first BS 110. Also, in order to transmit user plane data, the UE 102 may establish one or more DRBs with the second BS 120.

Figure 2:
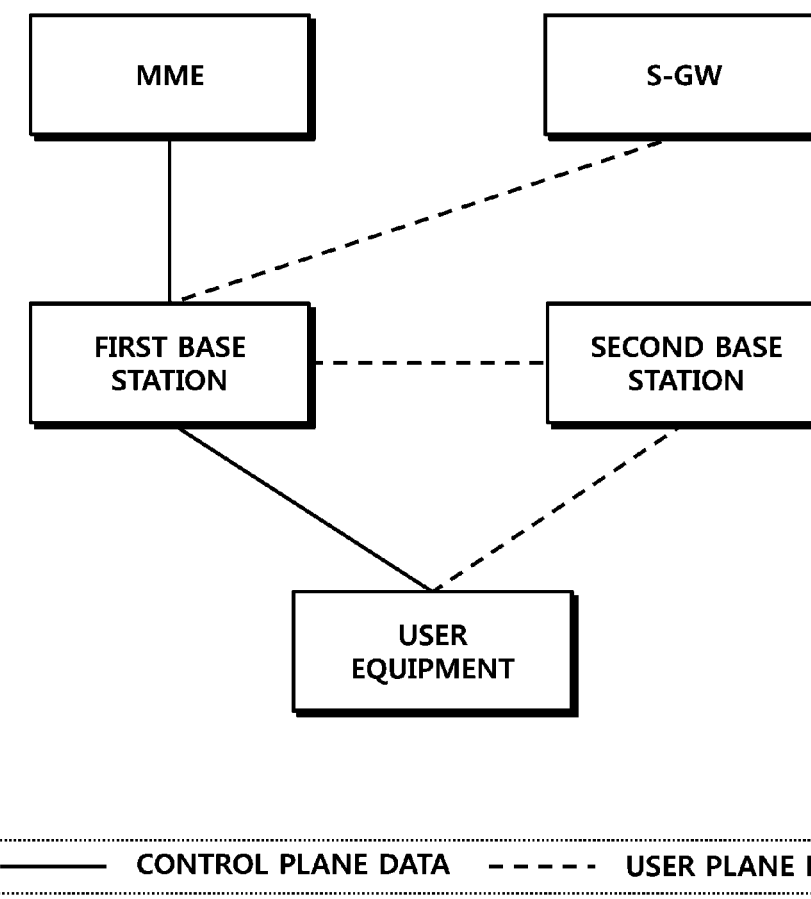
FIG. 2 is a view illustrating an example of a model for transmitting user data through an interface between a first base station and a second base station, to which the present invention may be applied.

FIG. 2 is a view illustrating an example of a model for transmitting user data through an interface between a first BS and a second BS, to which the present invention may be applied.

Referring to FIG. 2, user data may be transmitted from a Serving Gateway (S-GW), which is an entity of a core network (e.g., an Evolved Packet Core (EPC) network), to the first BS, and then the first BS may deliver the user data to the UE through the second BS.

Figure 3:
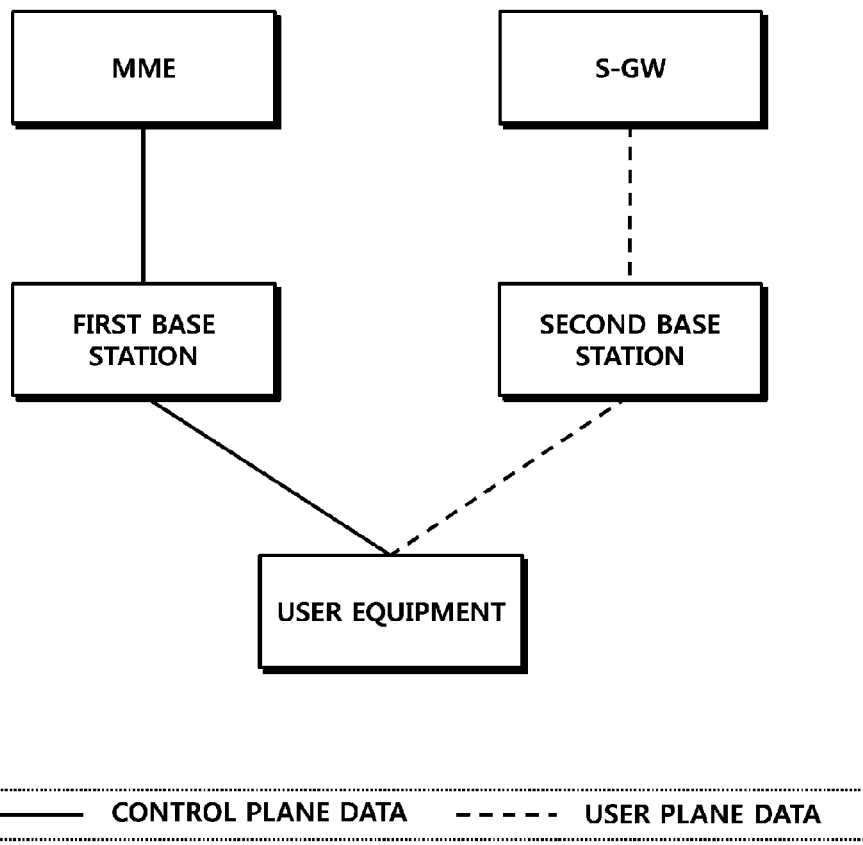
FIG. 3 is a view illustrating an example of a model for transmitting user data through an interface of a second base station, to which the present invention may be applied.

FIG. 3 is a view illustrating an example of a model for transmitting user data through an interface of a second BS, to which the present invention may be applied.

Referring to FIG. 3, user data may be delivered from an S-GW, which is an entity of a core network, directly to the UE through the second BS.

In FIGS. 2 and 3, a solid line represents a control plane data transmission path, and a dotted line represents a user plane data transmission path.

Alternatively, in a method different from those illustrated in FIGS. 2 and 3, under the control of the first BS (or through cooperation between the first BS and the second BS), the UE may transmit user plane data through both the first BS and the second BS, or through only the first BS.

Specifically, in order to transmit control plane data, the UE establishes one RRC connection with the first BS, and establishes one or more SRBs with the first BS. Also, in order to transmit user plane data, the UE may establish one or more DRBs in the first BS and the second BS. Alternatively, in order to transmit user plane data, the UE may establish one or more DRBs through only the first BS.

Hereinafter, an operation where the UE is located within either coverage of a cell provided by the first BS and a coverage of a cell provided by the second BS will be described.

When the UE is only under the first BS coverage (e.g., a macro cell), the UE may transmit all data through only the first BS. Specifically, in order to transmit control plane data, the UE may establish one RRC connection with the first BS, and may establish one or more SRBs with the first BS. Also, in order to transmit user plane data, the UE may establish one or more DRBs with the first BS.

When the UE is only under the second BS coverage (e.g., a small cell), the UE may transmit all data through only the second BS. Specifically, in order to transmit control plane data, the UE may establish one RRC connection with the second BS, and may establish one or more SRBs with the second BS. Also, in order to transmit user plane data, the UE may establish one or more DRBs with the second BS.

Alternatively, there may be a case in which the second BS transmits user plane data under the control of the first BS or through cooperation between the second BS and the first BS.

In this case, the UE may establish an RRC connection through only the cell provided by the first BS.

Specifically, although the UE is close to the second BS, when the UE is capable of receiving a signal having a predetermined level or more from the macro cell provided by the first BS, the UE may establish one RRC connection through only the first BS. In this case, the macro serving cell, which is provided by the first BS, may provide NAS mobility information (e.g., a TAI) and security input during establishment/re-establishment of an RRC connection/handover. Specifically, the first BS may process signaling required between the UE and the first BS, and may also process signaling required between the UE and the second BS.

A brief description is given for when the small cell provided by the second BS, together with the macro cell provided by the first BS, provide services to the UE. According to UE capacities, the small cell may be configured as a serving cell together with the macro cell. Alternatively, according to the UE capacities, the small cell may be configured as SCells or a serving cell under the control of the first BS. Alternatively, according to the UE capacities, the small cell may be configured as SCells or a serving cell that transmits user plane data under the control of the first BS. Alternatively, according to the UE capacities, the macro cell may transmit control plane data, and the small cell may be configured as SCells or a serving cell that transmits user plane data.

A procedure for adding or removing the small cell provided by the second BS as a serving cell or SCells for transmitting user plane data may be performed by RRC signaling through the first BS. Also, a procedure for adding or removing one or more DRBs through the second BS may also be performed by RRC signaling through the first BS. When it is determined that the first BS adds the small cell provided by the second BS as a serving cell or SCells for transmitting user plane data, or when it is determined that the first BS adds one or more DRBs through the second BS, the first BS may transmit all required system information of the small cell provided by the second BS through RRC signaling. Specifically, in a connected mode, the UE may not acquire system information directly broadcasted by the small cell provided by the second BS.

Hereinafter, multiple methods will be briefly described for selecting the macro cell when the UE is located within the coverage of the macro cell and the small cell as illustrated in FIG. 1.

A Method for Including Small Cell Identification Information in System Information and Broadcasting the System Information Including the Small Cell Identification Information In order to select a cell, a NAS layer of the UE identifies a selected Public Land Mobile Network (PLMN) and an equivalent PLMN. The UE searches for Evolved Universal Terrestrial Access (E-UTRA) frequency bands, and identifies a strongest cell for each carrier frequency. The UE reads cell system information in order to identify a PLMN. At this time, when the cell system information includes small cell identification information, the UE may identify that cell as a small cell, and may select a macro cell when the macro cell is available to select a cell.

To this end, the second BS broadcasts small cell related information through system information. Through system information (e.g., System Information Block type 1 (SIB1)), the second BS broadcasts small cell identification information, based on which the UE determines whether a cell provided by the second BS is a small cell, (e.g., information for identifying that a cell is capable of transmitting user plane data between the cell and the UE under the control of the first BS, or small cell indication information). The UE may determine whether the relevant cell is the small cell provided by the second BS, on the basis of this information. The above-described small cell identification information is information for identifying that the cell is capable of transmitting user plane data between the cell and the UE under the control of the first BS, and may use at least one of small cell indication information indicating whether a cell is a small cell, small cell IDentifier (ID) information, and cell type information.

A Method for Establishing Cell-Barred so as not to Allow Camping on a Small Cell The second BS enables the UE not to camp on the small cell by using Cell Access Related Info represented in SystemInformationBlockType1. Specifically, the second BS enables the UE not to select the small cell by establishing "barred" for cell-barred information.

A Method for Causing a Small Cell Using Frequency not to be Included in Cell Selection Candidates The UE may make a search for an available macro cell using frequency in order to select a cell. Only when a macro cell is unavailable, the UE may make a search for a small cell using frequency in order to select a cell, or may not make a search for a small cell using frequency in order to select a cell. To this end, the UE may broadcast information on a frequency used for a small cell, through system information of the first BS or through system information of the second BS. Alternatively, the information on the frequency used for the small cell may be configured within a Universal Subscriber Identity Module (USIM) and the like inside of the UE.

A Method for Changing the Selection of a Cell to a Macro Cell when a Small Cell is Selected When a small cell is selected by using the existing cell selection method, the UE or the second BS may start a cell reselection procedure and may select a macro cell. In order to allow the UE to reselect a macro cell, the first BS and/or the second BS may set a macro cell frequency to a cell reselection priority frequency and may broadcast the setting of the macro cell frequency to the cell reselection priority frequency, through system information. In another method, the first BS and/or the second BS may include information capable of setting a macro cell frequency to a cell reselection priority frequency in an RRC connection release message or an RRC connection reconfiguration message, and may transmit the RRC connection release message or RRC connection reconfiguration message including the information. Inter-frequency cell reselection is based on an absolute priority of a highest priority frequency available that the UE intends to camp on. Accordingly, through cell reselection, the UE may reselect a cell from the macro cell to a small cell.

A Method for Handing Over to a Macro Cell in an RRC-Connected State

After selecting the small cell, the UE may establish an RRC connection with the second BS, and the second BS may perform a handover procedure on the UE in an RRC-connected state. Accordingly, the second BS enables the UE to make an RRC connection to the macro cell. In another method, after selecting the small cell, the UE may establish an RRC connection with the second BS, and the second BS may include information, which is required to select a macro cell, in an RRC connection release message with respect to the UE in an RRC-connected state. Therefore, the second BS may allow the UE to select the macro cell.

When the UE, which has selected the macro cell by using the methods and the like, intends to establish an RRC connection, or when the UE in an RRC-idle state intends to establish an RRC connection in the macro cell, the UE may discover/identify a small cell, and may add the small cell and may establish DRBs in order to transmit user plane data. Alternatively, the UE may add a small cell and may establish DRBs in order to transmit user plane data by using the discovered/identified small cell. Alternatively, the UE may add a small cell and may establish DRBs in order to transmit user plane data on the basis of a measurement report according to the discovery/identification of the small cell.

Also, after the UE successfully completes the procedure for establishing an RRC connection with the first BS, or when the UE is in a state of an RRC connection with the first BS by establishing the RRC connection, the UE may discover/identify a small cell, and may add a small cell and may establish DRBs in order to transmit user plane data. Alternatively, the UE may add a small cell and may establish DRBs in order to transmit user plane data by using the discovered/identified small cell. Alternatively, the UE may add a small cell and may establish DRBs in order to transmit user plane data on the basis of a measurement report according to the discovery/identification of the small cell.

When the macro cell provided by the first BS and the small cell, which is provided by the second BS, use different carrier frequencies as illustrated in FIG. 1, a small cell capable of transmitting user plane data may be discovered or identified by using the following methods.

A Method for Using the Existing 3GPP Specifications

A small cell may be sensed by performing inter-frequency measurement by using measurement rules and a measurement gap pattern specified in a 3GPP standard document (i.e., Evolved Universal Terrestrial Radio Access Network (E-UTRAN) requirements for support of radio resource management) in order to sense the small cell using a carrier frequency different from that of a macro cell. For example, an existing standardized measurement gap pattern has a measurement gap of 6 ms and a gap periodicity equal to one of 40 ms and 80 ms. When the UE senses a small cell having a signal (e.g., Reference Signal Received Power (RSRP) and Reference Signal Received Quality (RSRQ)) stronger than a particular threshold T1, the UE may report measurement information on the relevant small cell.

A Method for Lengthening a Measurement Periodicity

In order to reduce battery consumption of the UE, with respect to inter-frequency measurement, a small cell may be sensed by using a method of increasing the length between the periodic measurements. In order to efficiently sense the small cell, with respect to inter-frequency measurement, the gap periodicity (either of 40 ms and 80 ms) may be lengthened. When the UE senses a small cell having a signal (e.g., RSRP and RSRQ) stronger than the particular threshold T1, the UE may report measurement information on the relevant small cell.

A Method for Shortening a Measurement Periodicity

When the UE intends to establishment an RRC connection, in order to quickly sense a small cell, the small cell may be sensed by using a method of shortening the length between the periodic measurements, with respect to inter-frequency measurement. For example, in order to sense the small cell, with respect to inter-frequency measurement, the gap periodicity (either of 40 ms and 80 ms) may be shortened, or measurement may be performed without gap assistance. When the UE senses a small cell having a signal (e.g., RSRP and RSRQ) stronger than the particular threshold T1, the UE may report measurement information on the relevant small cell.

The establishment of an RRC connection through the first BS includes the establishment of Signaling Radio Bearer 1 (SRB1). Prior to completing the establishment of an S1 connection, the first BS may complete the establishment of an RRC connection. Specifically, prior to receiving UE context information from an MME, the first BS may complete the establishment of an RRC connection.

As a result, Access Stratum (AS) security is not activated during the initial RRC connection step. During the initial the RRC connection step, the first BS enables the UE to configure measurement reporting.

When receiving the UE context from the MME, the first BS may activate security (i.e., ciphering and integrity protection) by using an initial security activation procedure. An RRC message for activating the security is integrity-protected, whereas ciphering is started after the procedure is completed.

The first BS starts the initial security activation procedure, and then establishes the SRB2 and DRBs. Specifically, before the first BS receives the confirmation of initial security activation from the UE, the first BS may start the establishment of SRB2 and DRBs. The first BS may use an RRC connection reconfiguration message to establish the SRB2 and the DRBs. The DRBs may be DRBs to transmit user plane data through the second BS. Alternatively, the DRBs may be DRBs to transmit user plane data through the first BS and the second BS. Both ciphering and integrity protection are applied to the message.

After starting the initial security activation procedure, the first BS may configure a small cell, which is provided by the second BS, for an optional UE, the UE that supports the CA, or a UE supporting the transmission of user plane data through the second BS under the control of the first BS. Specifically, the first BS may configure a small cell provided by the second BS in addition to a macro cell (or a PCell) that is first configured during the connection establishment and is provided by the first BS. The small cell provides DL and UL radio resources, and the DL and UL radio resources are used to transmit user plane data. As an example, the first BS may use an RRC connection reconfiguration message to add, modify, or remove the small cell.

Hereinafter, a detailed description will be given for a method for transmitting user plane data through a second BS 120 by a first BS 110 according to an embodiment of the present invention. Specifically, a description will be given for a procedure for adding, modifying, or removing a small cell provided by the second BS 120; or adding, modifying, or removing DRBs through the second BS 120 to allow the first BS 110 to transmit user plane data through the second BS 120 according to an embodiment of the present invention.

Figure 4:
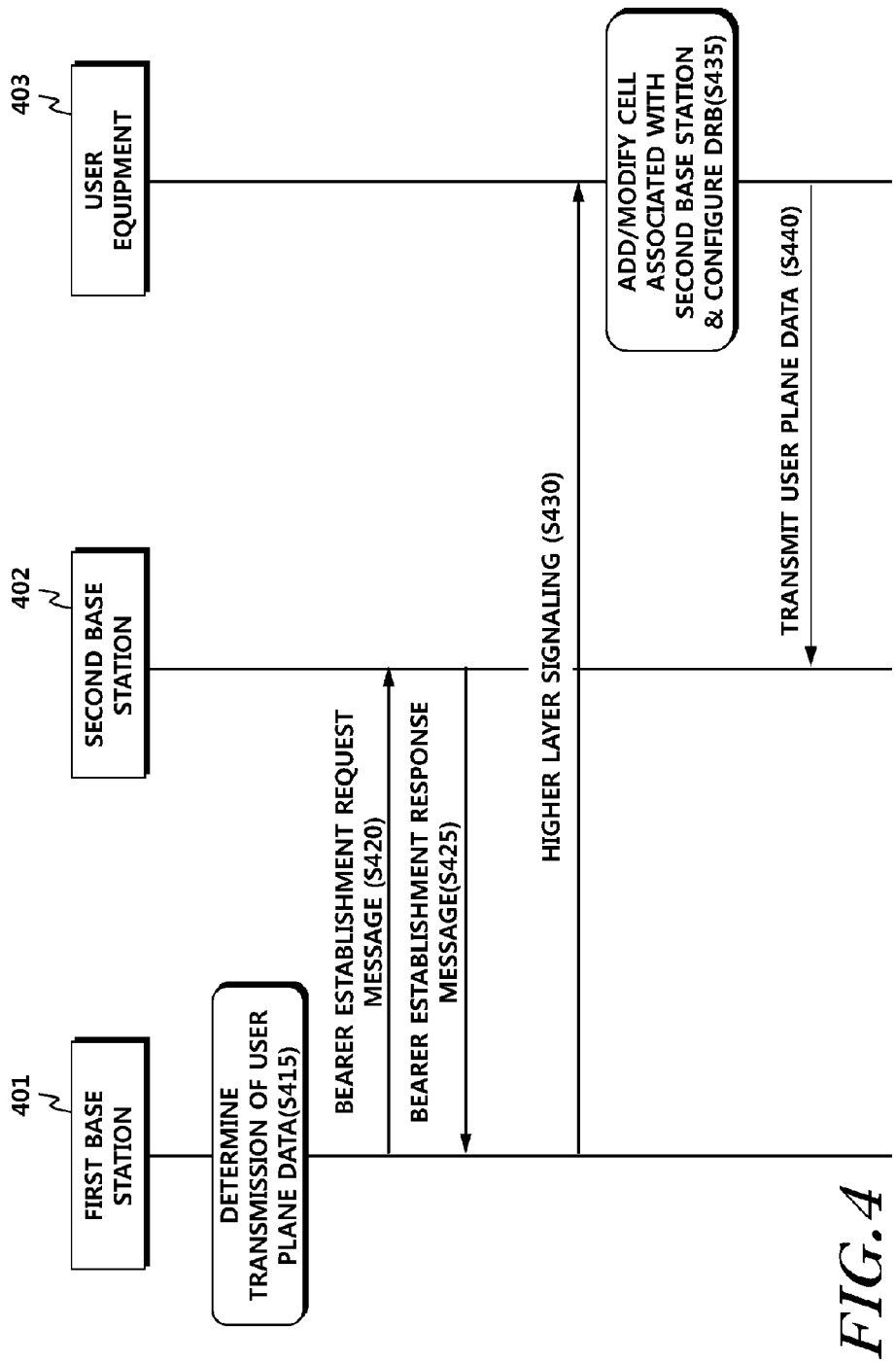
FIG. 4 is a signal flow diagram illustrating operations of a base station and a user equipment according to an embodiment of the present invention.

First Embodiment a method for performing addition/modification/removal of a small cell and addition/modification/removal of DRBs through the second BS in one procedure FIG. 4 is a signal flow diagram illustrating operations of a BS and a UE according to an embodiment of the present invention.

A method in which a first BS controls transmission of user plane data by a UE according to an embodiment of the present invention may include: selecting a radio bearer configured through the second BS based on at least one piece of information among load information and measurement report information of the first BS and determining the transmission of the user plane data; transmitting a bearer establishment request message to the second BS; receiving a bearer establishment response message from the second BS; and transmitting, to the UE, higher layer signaling including at least one piece of information among cell identifier information of a cell associated with the second BS, second BS cell index information, and DRB information configured through the second BS.

Referring to FIG. 4, the method for controlling the transmission of user plane data according to an embodiment of the present invention will be described in detail for each step.

In Step S415, a first BS 401 receives measurement reporting information and determines the transmission of user plane data through a radio bearer of a cell associated with a second BS 402.

In step S415, the first BS 401 may determine adding, modifying, or removing a small cell in order to transmit user plane data through the second BS 402, or adding, modifying, or removing DRBs through the second BS 402, with respect to the UE 403 in an RRC-connected state.

As an example, the first BS 401 may determine a DRB, which is to be served through the first BS 401, and a DRB, which is to be served through the second BS 402, by using various information (e.g., an E-UTRAN Radio Access Bearer (E-RAB) level Quality of Service (QoS) parameter and UE capabilities) within an initial context setup request message received from an MME.

In another example, in step S415, the first BS 401 may determine on the basis of at least one of measurement reporting information, which may be received from the UE 403 and data load information of the first BS 401. Specifically, the first BS 401 may determine the DRB, which is to be served through the first BS 401, and a DRB, which is to be served through the first BS 401 and the second BS 402.

Accordingly, the first BS 401 may start a signaling procedure during the establishment of a bearer for transmitting user plane data to the second BS 401. Specifically, the first BS 401 may select an E-RAB, which is intended to be transmitted through the second BS 402 (or the first and second BSs 401, 402), in view of load information of the first BS 401, measurement reporting information, and the like on the basis of a QoS parameter (e.g., a QoS Class Identifier (QCI), an allocation and retention priority, and Guaranteed Bit Rate (GBR) QoS) for each E-RAB. As an example, a GBR bearer or an E-RAB, which has a particular QCI or a particular allocation and retention priority value, may be transmitted through the first BS 401, and a request for establishing a DRB may not be sent to the second BS 402. Alternatively, a request for establishing a DRB may be sent to the second BS 402 so as to transmit a non-GBR bearer for Internet traffic or an E-RAB, which has another particular QCI or another particular allocation and retention priority value, through the second BS 402. Alternatively, a request for establishing a DRB may be sent to the first BS 401 and the second BS 402 so as to transmit a non-GBR bearer for Internet traffic or an E-RAB, which has another particular QCI or another particular allocation and retention priority value, through the first BS and the second BS.

In step S420, when the transmission of user plane data through the second BS 402 is determined, the first BS 401 may transmit a bearer establishment request message to the second BS 402.

In step S420, when the transmission of user plane data through the second BS 402 is determined (for example, when it is determined to add/modify a small cell, to add/modify DRBs to/in a small cell, or to add/modify DRBs by adding a small cell), the first BS 401 transmits a bearer establishment request message for transmitting the user plane data to the second BS 402 before or after the security activation procedure is started.

As another example, in step S420, when the transmission of user plane data through the second BS 402 is determined while the UE 403 is in an RRC-connected state, the first BS 401 may transmit a bearer establishment request message for transmitting the user plane data.

The bearer establishment request message, according to an embodiment of the present invention, may include at least one of first BS UE X2 Application Protocol (X2AP) identifier information, cell ID information associated with the second BS, second BS cell index information, a UE Aggregate Maximum Bit Rate (UE-AMBR), and E-UTRAN Radio Access Bearers (E-RABs) setup list information. In addition, the bearer establishment request message, according to an embodiment of the present invention, may include information described below.

Specifically, for example, the bearer establishment request message for transmitting user plane data through the second BS 402 may include one or more information among the following pieces of information.

A message type: includes information for identifying the procedure type of a message.

A first BS UE X2AP ID: is assigned by the master BS and includes ID information which uniquely identifies a UE on an X2 interface within the master BS.

A cell (small cell) ID associated with the second BS: includes E-UTRAN Cell Global Identifier (ECGI) of a cell provided by the second BS or Physical Cell ID (PCI) information of the small cell.

A second BS cell (small cell) index: includes index information for identifying each cell (small cell) or each SCell provided by second BS 402 within SCells configured for the UE 403, within cells (small cells) configured for the UE 403 and provided by the second BS 402, within cells (small cells) configured as a SCell for the UE 403 and provided by the second BS 402, or within SCells configured by using a cell provided from the second BS 402 to the UE 403.

UE context information: UE context information may include the following information.

1) UE security capabilities: includes information on an algorithm that supports ciphering and integrity protection within the UE 403. Alternatively, the UE security capabilities include information on an algorithm that supports ciphering within the UE 403. Alternatively, the UE security capabilities include information on an algorithm that supports the ciphering of user plane data within the UE 403. In another method, the UE security capabilities information may not be included in the bearer establishment request message, and may be managed only by the first BS 401.

2) AS security information or an AS security key: the second BS 402 includes ciphering key ($K_{UPenc}$) information on user plane data. Alternatively, the AS security information or AS security key includes BS key ($K_{eNB}$) information for deriving a ciphering key ($K_{UPenc}$). The above-described information may use a value identical to that of $K_{UPenc}$ or $K_{eNB}$ of the first BS 401, or may use a value different from that of $K_{UPenc}$ or $K_{eNB}$ of the first BS 401.

3) A UE-AMBR: is a maximum bit rate set applied to all non-GBR bearers per UE 403, is defined in a UL or DL direction, and is a value provided from an MME to the first BS 401. Alternatively, for example, when the first BS 401 forwards user plane data through the second BS 402, the UE-AMBR information may not be included in the bearer establishment request message, and may be managed only by the first BS 401. When all non-GBR bearers configured for a particular UE 403 are configured through the second BS 402, the UE-AMBR may be included. Alternatively, when at least one non-GBR bearer configured for a particular UE 403 is configured through the second BS 402, the UE-AMBR may be included. Alternatively, when at least one non-GBR bearer configured for a particular UE 403 is configured through the second BS 402, the UE-AMBR and processing ratio information of the UE-AMBR through the second BS 402 may be included.

4) E-RABs setup list (E-RABs to be setup list) information through the second BS 402: includes information on an E-RABs setup item. The E-RABs setup item may include at least one of an E-RAB ID, an E-RAB level QoS parameter, and GTP tunnel endpoint information.

Information that may be included in the E-RABs setup item is described in detail. The E-RAB ID may include information for identifying a radio access bearer for the UE 403. Also, the E-RAB level QoS parameter is QoS information applied to an E-RAB, and may include a QCI, an allocation and retention priority, and GBR QoS information. Further, when user plane data is transmitted through the interface between the first BS 401 and the second BS 402 as illustrated in FIG. 2, the GTP tunnel endpoint is an endpoint of a bearer for transmitting the user plane data between the first BS 401 and the second BS 402, and may include a transport layer address, which is an Internet protocol (IP) address of the first BS 401, and a GTP Tunnel Endpoint ID (TEID). Alternatively, in another method, when user plane data is transmitted through the interface between the S-GW and the second BS 402 as illustrated in FIG. 3, the GTP tunnel endpoint is an endpoint between the S-GW and the second BS 402, and may include a transport layer address, which is an IP address of the S-GW, and a GTP TEID.

5) UE capability information: includes UE capability information, which is required to configure radio resources for transmitting user data through the second BS 402, in UE capability information included in UE context information received through an MME. For example, the UE capability information may include information related to single Tx/Rx or multi Tx/Rx.

As described above, the bearer establishment request message may include at least one of the multiple information described above.

In step S425, the first BS 401, according to an embodiment of the present invention, may receive a bearer establishment response message from the second BS 402.

In step S425, the second BS 402, which has received from the first BS 401, the bearer establishment request message for transmitting user plane data, transmits the bearer establishment response message to the first BS 401.

The bearer establishment response message, according to an embodiment of the present invention, may include at least one of cell identification information associated with the second BS, second BS cell index information, random access channel preamble information of the second BS cell, second BS cell system information, MAC layer configuration information dedicated to the second BS cell, E-RABs admitted list information, and second BS DRB configuration information on the admitted E-RAB.

Also, the bearer establishment response message, according to an embodiment of the present invention, may further include information among first BS ID information, second BS ID information, and dedicated radio resource configuration information. Further, the bearer establishment response message, according to an embodiment of the present invention, may further include information described below in detail.

Specifically, for example, the bearer establishment response message may include at least one of the following information.

A message type: includes information for identifying the procedure type of a message.

A first BS UE X2AP ID: includes ID information assigned by the first BS.

A second BS UE X2AP ID: includes ID information assigned by the second BS.

A cell (small cell) ID associated with the second BS 402: includes an ECGI or a PCI of a small cell associated with the second BS 402, an Absolute Radio Frequency Channel (ARFCN) of the small cell associated with the second BS 402, or discrimination information (e.g., discriminates and represents whether a cell is associated with the second BS 402 by using one bit) for identifying that the cell is associated with the second BS 402.

A second BS cell (small cell) index: includes index information for identifying each secondary cell (small cell) or each SCell associated with second BS 402 within SCells configured for the UE, within secondary cells (small cells) configured for the UE 403 and associated with the second BS 402, within secondary cells (small cells) configured as a SCell for the UE 403 and associated with the second BS 402, or within SCells configured by using a secondary cell associated with the second BS 402 for the UE 403.

E-RABs admitted list information: may include E-RABs admitted item information. The E-RABs admitted item information may include at least one of an E-RAB ID, a GTP tunnel endpoint, a DRB ID, PDCP configuration information (PDCP-Config), RLC configuration information (RLC-Config), a logical channel identity (logicalChannelIdentity), logical channel configuration information (logicalChannelConfig), and physical channel configuration information (PhysicalConfigDedicated).

Specifically, the E-RAB ID includes information for identifying a radio access bearer for the UE 403. Also, when user plane data is transmitted through the interface between the first BS 401 and the second BS 402 as illustrated in FIG. 2, the GTP tunnel endpoint is an endpoint of a bearer between the first BS 401 and the second BS 402. Alternatively, in another method, when user plane data is transmitted through the interface between the S-GW and the second BS as illustrated in FIG. 3, the GTP tunnel endpoint is an endpoint between the S-GW and the second BS 402, and includes a transport layer address, which is an IP address of the second BS, and a GTP TEID.

Further, the E-RABs admitted item information may include second BS DRB configuration information on the admitted E-RAB.

Specifically, when user plane data is transmitted through the interface between the S-GW and the second BS 402 as illustrated in FIG. 3, the PDCP configuration information (PDCP-Config) includes PDCP layer configuration information for a radio bearer, which is transmitted through the second BS 402, within the UE 403. The RLC configuration information (RLC-Config) includes RLC layer configuration information for a radio bearer, which is transmitted through the second BS 402, within the UE 403. The logical channel identity (logicalChannelIdentity) and the logical channel configuration information (logicalChannelConfig) represent logicalChannelIdentity and logicalChannelConfig for a radio bearer, which is transmitted through the second BS 402, within the UE 403. The physical channel configuration information (PhysicalConfigDedicated) represents physical layer configuration information for a radio bearer, which is transmitted through the second BS 402, within the UE 403.

An E-RABs not admitted list: includes list information of a radio bearer which may not be processed among radio bearers requested through the second BS 402 according to the load, state, or the like of the second BS 402.

For example, when all requested bearers are not processed as in a case where traffic load is high, the second BS 402 may include a list of all the requested bearers in the E-RABs not admitted list, or may deliver a message (e.g., a reject message) of a different message type.

Random access channel preamble of the second BS cell: includes preamble information (e.g., ra-PreambleIndex included in Random Access CHannel (RACH)-ConfigDedicated information) for performing a contention-free random access procedure through a cell associated with the second BS 402.

Second BS cell (small cell) system information: is system information on a SCell or a small cell configured by the second BS 402. The second BS cell (small cell) system information includes common radio resource configuration information (RadioResourceConfigCommon information) required to transmit user plane data through the second BS 402. For example, the second BS cell (small cell) system information includes Physical Downlink Shared CHannel (PDSCH)-config, Physical Hybrid-ARQ Indicator CHannel (PHICH)-Config, Physical Uplink Shared CHannel (PUSCH)-Config, Time Division Duplex (TDD)-Config, and the like.

As described above as an example, the bearer establishment response message may include at least one piece of information among the pieces of information.

Step S430 the first BS 401 according to an embodiment of the present invention may transmit to the UE 403 higher layer signaling including at least one of cell (small cell) ID information associated with the second BS 402 on a cell associated with the second BS 402, second BS cell (small cell) index information, and DRB information configured through second BS 402.

An example is described. In step S430, after the first BS 401 completes a bearer establishment signaling procedure between the first BS 401 and the second BS 402 for transmitting user plane data (e.g., after receiving the bearer establishment response message in step S425), the first BS 401 may include information on a cell (small cell) provided by the second BS 402, which is to be added/modified, in higher layer signaling (e.g., an RRC connection reconfiguration message), and may transmit the higher layer signaling including the information on the cell (small cell).

Alternatively, after the first BS 401 starts the bearer establishment signaling procedure (e.g., after transmitting the bearer establishment request message in step S420), the first BS 401 may transmit higher layer signaling to the UE 403. The UE 403 may receive the higher layer signaling from the first BS 401, and may add/modify a cell (small cell), which is associated with the second BS 402, for transmitting user plane data. Alternatively, the UE 403 may add/modify a cell (small cell), which is associated with the second BS 402, as a SCell. Also, according to another embodiment of the present invention, at least one of cell ID information associated with the second BS 402 and second BS cell index information may be included in information (DRB-ToAddMod) on a DRB to be added/modified, and the DRB-ToAddMod information including the at least one information may be transmitted.

Also, DRB information configured through the second BS 402, according to still another embodiment of the present invention, may include at least one of information that allows the UE 403 to distinguish the first BS 401 from the second BS 402 in an MAC layer, and information that allows the UE 403 to distinguish a cell provided by the first BS 401 from a cell provided by the second BS 402 in the MAC layer.

A description will be made of an example of cell ID information associated with the second BS 402 for identifying the second BS cell, second BS cell index information, and radio resource configuration information of DRB information configured through the second BS 402 in a case where the higher layer signaling includes the information on the cell (small cell) associated with the second BS 402 which is to be added/modified.

A cell (small cell) ID associated with the second BS: includes at least one of a PCI and an ARFCN of a cell (small cell) associated with the second BS 402, and discrimination information for identifying that a cell is the second BS cell. For example, the discrimination information for identifying that a cell is the second BS cell may be representation information that discriminates and represents whether a cell is associated with the second BS 402 by using one bit.

A second BS cell (small cell) index (or a SCell index): includes index information used to identify each second BS 402 secondary cell (small cell) or each SCell within SCells configured for the UE 403, within second BS cells (small cells) configured for the UE 403, within second BS cells (small cells) configured as a SCell for the UE 403, or within SCells configured by using a second BS cell (small cell) for the UE 403.

The first BS 401 may determine or assign the second BS cell index information, may include the second BS cell index information in a bearer establishment request message, and may transmit the bearer establishment request message including the second BS cell index information. However, the second BS cell index information may not be included in a bearer establishment response message.

Alternatively, the first BS 401 may determine or assign the second BS cell index information, may include the second BS cell index information in a bearer establishment request message, and may transmit the bearer establishment request message including the second BS cell index information. The second BS 402 may confirm that the bearer establishment request message includes the second BS cell index information, and may also include the second BS cell index information in a bearer establishment response message.

In another method, the second BS 402 may determine or assign the second BS cell index (or SCell index) information, may include the second BS cell index information in the bearer establishment response message and may transmit the bearer establishment response message including the second BS cell index information. At this time, the second BS cell index information may not be included in the bearer establishment request message of the first BS 401.

In still another method, the second BS cell index (or SCell index) information may use a value (e.g., 8) different from a value (e.g., 1 to 7) used as an existing SCell index so as to distinguish a second BS cell from a SCell of the first BS 401. In this case, the second BS cell index information may not be included in both the bearer establishment request message and the bearer establishment response message. Alternatively, the second BS cell index information may be included in the bearer establishment request message and/or the bearer establishment response message. Specifically, in order to use a different value from a value used as the existing SCell index, a SCell index, which may currently have an integer value of 1 to 7, may have an integer value of 1 to 14, integer values from 1 to 7 may be used as indices for SCells of the master BS (i.e., first BS 401), and 8 to 14 may be used as indices for cells of the secondary BS (i.e., second BS 402).

In yet another method, a SCell index and a field named "second BS ID (or second BS cell ID)" may be transmitted together so as to enable a second BS cell to be distinguished from a SCell of the first BS 401. In still yet another method, so as to enable the second BS 402 cell to be distinguished from the SCell of the first BS 401, a SCell index may be configured by including one bit within the SCell index as a field for identifying that a cell is the second BS 402 (or the second BS cell).

Small cell common radio resource configuration information: is information essential to allow the UE 403 to operate in a cell (small cell) associated with the second BS 402 and may include a physical layer configuration parameter, or a physical layer configuration parameter and an MAC layer configuration parameter that correspond to system configuration information.

Small cell dedicated radio resource configuration information: may include UE-specific configuration information (e.g., physical channel configuration and mac-MainConfig) for operating in a cell (small cell) associated with the second BS 402.

For example, the small cell dedicated radio resource configuration information may include at least one of the RLC layer configuration information within the UE 403 for a radio bearer transmitted through the second BS 402, the logical channel identity (logicalChannelIdentity) for a radio bearer transmitted through the second BS 402, the logical channel configuration information (logicalChannelConfig) for a radio bearer transmitted through the second BS 402, the preamble information for performing a random access procedure which is contention-free with respect to a cell associated with the second BS 402, and the physical layer configuration information for a radio bearer transmitted through the second BS 402.

In step S435, the UE 403 may receive higher layer signaling including the information, and may add/modify a cell associated with the second BS 402. In step S440, the UE 403 may add/modify the cell associated with the second BS 402 and may transmit user plane data to the second BS 402.

As described above, the first BS 401 may include DRB information, which is configured through the second BS 402, in the higher layer signaling, and may control the addition/modification/change of a DRB by the UE 403.

Specifically, in step S430, after the first BS 401 completes a bearer establishment signaling procedure between the first BS 401 and the second BS 402 for transmitting user plane data (e.g., after receiving the bearer establishment response message in step S425), the first BS 401 may include information on DRBs, which are to be added/modified, in an RRC connection reconfiguration message, and may transmit the RRC connection reconfiguration message including the information on the DRBs.

The UE 403 may receive the higher layer signaling and in order to transmit the user plane data may add/modify DRBs between the UE 403 and the second BS 402, or may modify DRBs of the first BS 401 to DRBs of the second BS 4030.

Alternatively, the UE 403 may modify the DRBs of the first BS 401 to DRBs through the first BS 401 and the second BS 402.

Radio bearer information configured through the second BS 402, according to an embodiment of the present invention, may include at least one of DRB identification information, PDCP and RLC configuration information, a logical channel identity, logical channel configuration information, and cell ID information associated with the first BS 401.

Also, DRB information configured through the second BS 402 may include at least one of information that allows the UE 403 to distinguish the first BS 401 from the second BS 402 in an MAC layer, and information that allows the UE 403 to distinguish a cell provided by the first BS 401 from a cell provided by the second BS 402 in the MAC layer.

For example, DRB information including information on DRBs, which are to be added/modified, may include at least one information among the following information.

Evolved Packet System (EPS)-Bearerridentity: is an EPS bearer ID and may include E-RAB ID information.

A cell (small cell) ID associated with the second BS 402: may include at least one of a PCI and an ARFCN of a cell associated with the second BS 402, and discrimination information for identifying that a cell is the second BS cell. For example, the discrimination information for identifying that a cell is the second BS cell may be information that discriminates and represents whether a cell is associated with the second BS 402 by using one bit.

A second BS cell (small cell) index: may include index information used to identify each second BS cell (small cell) or each SCell within SCells configured for the UE 403, within second BS cells (small cells) configured for the UE 403, within second BS cells (small cells) configured as a SCell for the UE 403, or within a SCell configured by using a second BS cell (small cell) for the UE 403.

DRB-ID: includes DRB-ID information received from the second BS 402.

PDCP-Config: includes PDCP-Config information received from the second BS 402.

RLC-Config: includes RLC-Config information received from the second BS 402.

logicalChannelIdentity: includes information on a logical channel ID.

logicalChannelConfig: includes information on logical channel configuration information received from the second BS 402.

The first BS 401, according to another embodiment of the present invention, may transmit higher layer signaling including the DRB information after starting a bearer establishment signaling procedure (e.g., after transmitting a bearer establishment request message to the second BS 402).

After the UE 403 receives the higher layer signaling from the first BS 401, in step S435, in order to transmit user plane data, the UE 403 may add/modify DRBs between the UE 403 and the second BS 402, or may modify DRBs of the first BS 401 to DRBs of the second BS 402.

Alternatively, in step S435, the UE 403 may modify the DRBs of the first BS 401 to DRBs through the first BS 401 and the second BS 402.

For example, DRB information, which is transmitted after transmitting the bearer establishment request message, may include at least one information among the following.

EPS-Bearerridentity: is an EPS bearer ID and may include E-RAB ID information.

A cell (small cell) ID associated with the second BS 402: may include a PCI and ARFCN information of a cell associated with the second BS 402.

A second BS cell (small cell) index: may include index information used to identify each second BS cell (small cell) or each SCell within SCells configured for the UE 403, within second BS cells (small cells) configured for the UE 403, within second BS cells (small cells) configured as a SCell for the UE 403, or within a SCell configured by using a second BS cell (small cell) for the UE 403.

DRB-ID: may include DRB-ID information that the first BS 401 determines and delivers to the second BS 402.

PDCP-Config: may include PDCP-Config information that the first BS 401 determines and delivers to the second BS 402.

RLC-Config: may include RLC-Config information that the first BS 401 determines and delivers to the second BS 402.

logicalChannelIdentity: may include logical channel ID information.

logicalChannelConfig: may include logical channel configuration information.

As described above, after receiving a bearer establishment response message or transmitting a bearer establishment request message, the first BS 401 may transmit to the UE 403 higher layer signaling including the information.

Also, it may be represented that the DRB to be added/modified is configured through a small cell (or second BS) so as to further include identification information for distinguishing the second cell (small cell) from a first BS cell (macro cell), together with information on a DRB to be added/modified or information on a DRB to be released, in the higher layer signaling transmitted to the UE 403 as described above.

For example, when DRBs previously configured through the first BS 401 are added/modified through the second BS 402, information on a DRB to be added/modified may include a small cell ID (or second BS ID information).

Also, information (DRB-ToAddMod) on a DRB to be released may include information on a DRB to be released in a macro cell and macro cell ID information (or first BS ID information) together.

In another method, when the second BS cell (small cell) index or SCell index is capable of discriminating between second BS cells (or second BSs), the second BS cell (small cell) index or SCell index may be included in the DRB to be added/modified.

Hereinafter, when the first BS 401 according to an embodiment of the present invention includes DRB information in higher layer signaling, subjects will be described in detail which determines respective parameters of the included information.

Higher layer signaling, according to an embodiment of the present invention, may further include information for configuring a cell associated with the second BS 402, and the information for configuring the cell associated with the second BS 402 may be information that the second BS 402 establishes and transmits to the first BS 401.

Specifically, second BS cell index information and DRB information configured through the second BS 402 may be information that the second BS 402 establishes and transmits to the first BS 401.

Alternatively, the information for configuring the cell associated with the second BS 402 may be established by the first BS 401 on the basis of at least one of measurement reporting information, data load information of the first BS 401, and a bearer establishment response message.

A specific example of each case will be described.

1) A Method in which the Second BS 402 Makes a Determination

The first BS 401 may include, in a bearer establishment request message, at least one of information (e.g., an E-RABs list) within an initial context setup request message received from an MME, measurement reporting information, and data load information of the first BS 401, and may deliver to the second BS 402 the bearer establishment request message including the at least one information.

The second BS 402 may determine parameters included in the higher layer signaling on the basis of the delivered information.

Specifically, the second BS 402 may determine parameters included in second BS cell index information and DRB information configured through the second BS 402, or respective information on the basis of the delivered information.

The determined parameter information may be transmitted to the first BS 401, and may be transmitted to the UE 403 through higher layer signaling (e.g., an RRC connection reconfiguration message).

2) A Method in which the First BS 401 Makes a Determination

The first BS 401 may determine the parameters on the basis of at least one of information (e.g., an E-RABs list) within an initial context setup request message received from the MME, measurement reporting information, and data load information of the first BS 401. Specifically, the parameters (e.g., PDCP configuration information, RLC configuration information, MAC configuration information, etc.), which are included in higher layer signaling (e.g., an RRC connection reconfiguration message), may be determined by the first BS 401.

3) Another Method in which the First BS 401 Makes a Determination

The first BS 401 may determine the parameters on the basis of information (e.g., an E-RABs list) within an initial context setup request message received from the MME, measurement reporting information, data load information of the first BS, and a bearer establishment response message received from the second BS 402.

Figure 5:
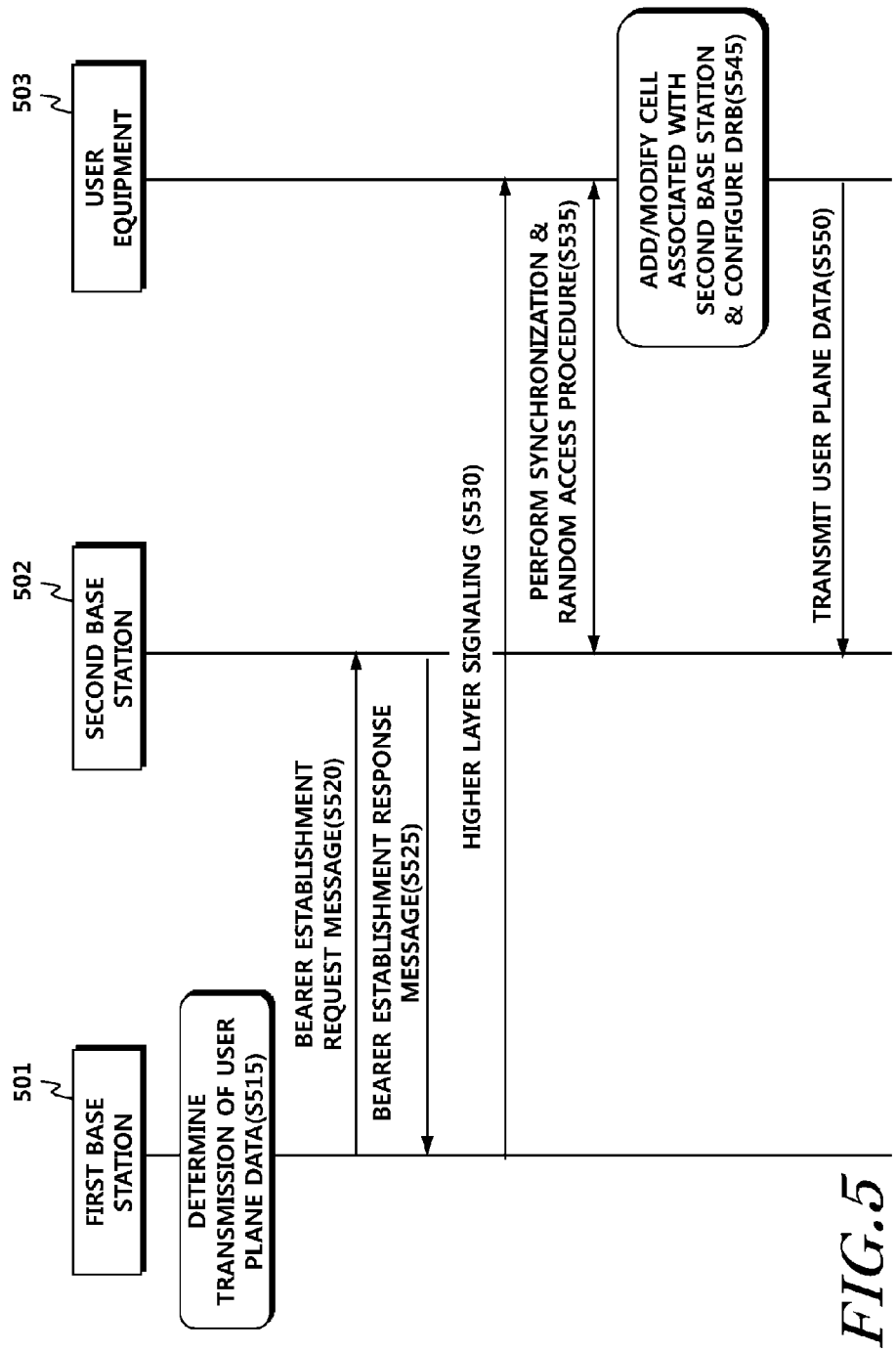
FIG. 5 is a signal flow diagram illustrating operations of a base station and a user equipment according to another embodiment of the present invention.

FIG. 5 is a signal flow diagram illustrating operations of a BS and a UE according to another embodiment of the present invention.

In step S530, the first BS 501 according to another embodiment of the present invention may further include, in higher layer signaling, at least of cell identification information associated with the second BS 502 which allows the UE 503 to access a cell associated with the second BS 502, second BS cell system information, second BS 502 dedicated MAC layer configuration information, and a random access channel preamble of the second BS cell, and may transmit the higher layer signaling including the at least one information.

In step S535, the UE 503 may receive from the first BS 501 the related information for accessing a cell associated with the second BS 502 and may perform a random access procedure for UL synchronization between the UE 503 and the second BS 502.

Also, the first BS 501 may include, in the higher layer signaling, the related information for accessing the cell associated with the second BS 502 and may transmit the higher layer signaling including the related information.

Step S535 of performing the random access procedure for UL synchronization between the UE 503 and the second BS 502 may be performed before step S545 of adding/modifying a cell associated with the second BS 502 and adding/modifying DRBs (e.g., a second BS 502 dedicated bearer or bearers of the first BS 501 and the second BS 502) associated with the second BS 502. Alternatively, step S535 of performing the random access procedure for UL synchronization between the UE 503 and the second BS 502 may be performed after step S545 of adding/modifying a cell associated with the second BS 502 and adding/modifying DRBs (e.g., a second BS 502 dedicated bearer or bearers of the first BS 501 and the second BS 502) associated with the second BS 502. Alternatively, step S535 of performing the random access procedure for UL synchronization between the UE 503 and the second BS 502 may be performed in parallel with step S545 of adding/modifying a cell associated with the second BS 502 and adding/modifying DRBs (e.g., a second BS 502 dedicated bearer or bearers of the first BS 501 and the second BS 502) associated with the second BS 502.

Hereinafter, referring to FIG. 5, a detailed description will be made of the transmission of related information and a random access procedure for accessing a cell associated with the second BS 502.

After the first BS 502 completes a bearer establishment signaling procedure between the first BS 501 and the second BS 501 for transmitting user plane data (e.g., after receiving a bearer establishment response message in step S525, or after receiving a bearer establishment response message from the second BS 502 in step S525 after completing the establishment of an S1 bearer between the second BS 502 and an S-GW), in step S530, the first BS 501 may transmit information for the random access procedure for UL synchronization of the UE 503 through higher layer signaling (e.g., an RRC connection reconfiguration message).

The first BS 501 may transmit information for the random access procedure for UL synchronization of the UE 503 in such a manner that the information includes cell identification information and radio resource configuration information of a second BS cell (small cell) for enabling the UE 503 to gain access to the second BS cell through a RACH in order to allow the UE 503 to perform UL synchronization between the UE 503 and the second BS cell and to perform transmission to the second BS cell.

The above-described radio resource configuration information of the second BS cell (small cell) may include second BS cell system information and a random access channel preamble, which are received through a bearer establishment response message; and UE-specific configuration information and second BS dedicated MAC layer configuration information for operating in the second BS cell (small cell); and the like.

In the above example, a case has been described in which the related information for accessing the second BS cell is transmitted through higher layer signaling. However, the related information for accessing the second BS cell may be transmitted in a step separate from that of transmission of higher layer signaling.

After the UE 503 receives the higher layer signaling (e.g., an RRC connection reconfiguration message) including the radio resource configuration information of the second BS cell (small cell), in step S535, the UE 503 performs UL synchronization through a RACH procedure between the UE 503 and the cell of the second BS 502. When the higher layer signaling includes the dedicated random access channel preamble information, the UE 503 may perform the random access procedure according to a contention-free procedure. In contrast, when the higher layer signaling does not include the dedicated random access channel preamble, the UE 503 may perform the random access procedure according to a contention-based procedure.

For example, when the UE 503 performs the random access procedure according to a contention-free procedure, the UE 503 may perform the random access procedure by transmitting a RACH preamble, which has been generated by the second BS cell and has been received through the first BS 501, to the second BS cell, and receiving a RACH response message (i.e., a Random Access Response (RAR)) from the second BS cell in response to the transmitted RACH preamble.

With respect to the higher layer signaling (e.g., an RRC connection reconfiguration message), one message may include, together, information on a small cell to be added/modified, information on DRBs to be added/modified, and random access information for UL synchronization, or each individual message, which includes the at least one information, may be transmitted.

Figure 6:
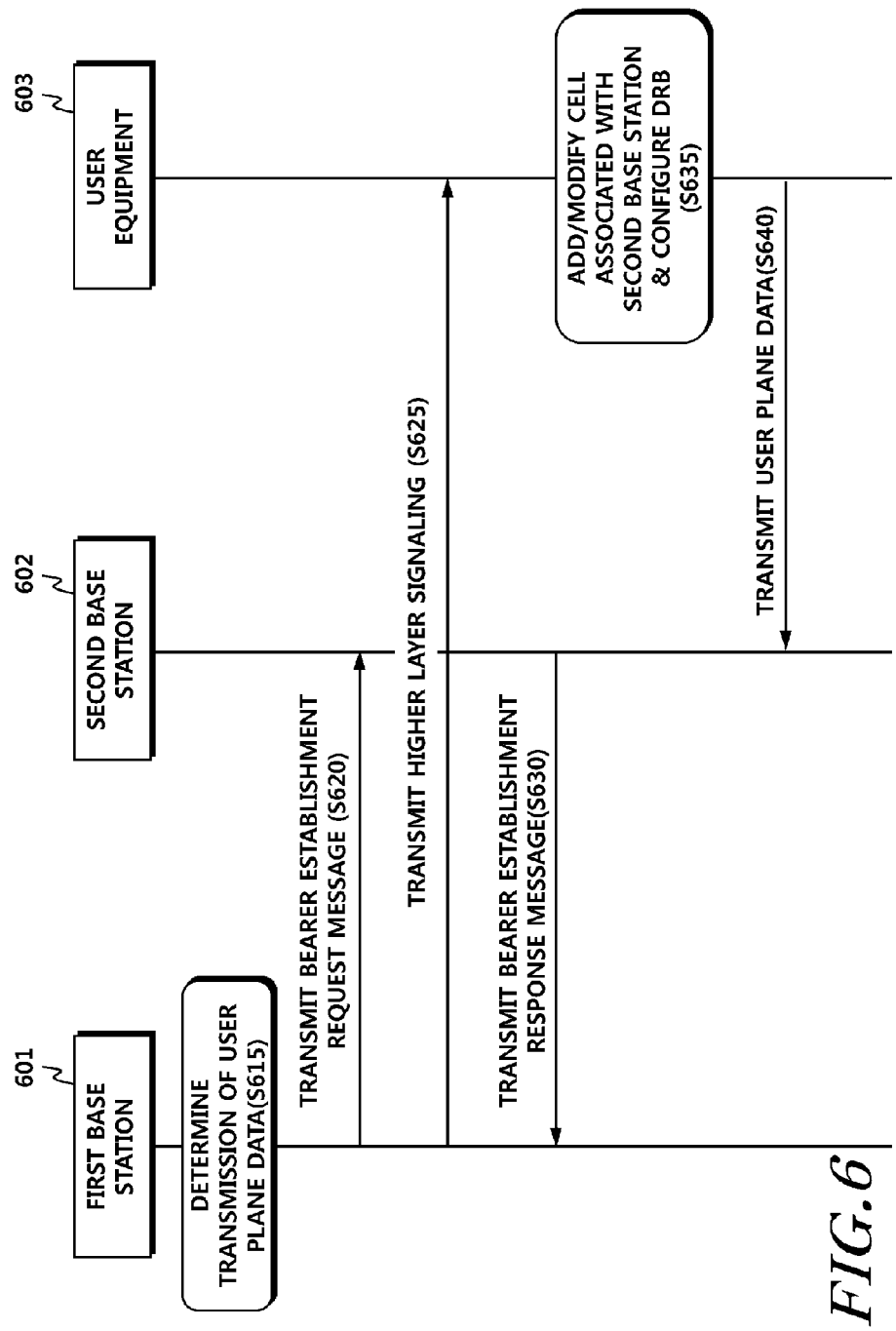
FIG. 6 is a signal flow diagram illustrating operations of a base station and a user equipment according to still another embodiment of the present invention.

FIG. 6 is a signal flow diagram illustrating operations of a BS and a UE according to still another embodiment of the present invention.

In step S625, a step of transmitting higher layer signaling to the UE 603 by the first BS 601 according to still another embodiment of the present invention may be performed before a step of receiving a bearer establishment response message from 1 second BS 602 by the first BS 601.

Specifically, as described above, with respect to the higher layer signaling (e.g., an RRC connection reconfiguration message), one message may include, together, information on a small cell (i.e., a cell associated with the second BS 602) to be added/modified, information on DRBs to be added/modified, and random access information for UL synchronization, or each individual message, which includes the at least one information, may be transmitted.

In this case, the higher layer signaling may be transmitted after the first BS 601 transmits a bearer establishment request message to the second BS 602, or after the first BS 601 receives the bearer establishment response message.

Also, when the higher layer signaling does not include the random access-related information for UL synchronization, the higher layer signaling may be transmitted to the UE 603 before the first BS 601 receives the bearer establishment response message.

In step S640, the UE 603 transmits user plane data through the second BS 602 and the established DRBs.

Hereinabove, the detailed description has been made of the method in which the first BS 601 controls the transmission of user plane data by the UE 603 according to an embodiment of the present invention.

Hereinafter, a method in which a first BS 601 controls transmission of user plane data by a UE 603 according to another embodiment of the present invention will be described in detail with reference to the accompanying drawings.

Another embodiment: a method for performing, as separate procedures, addition/modification/removal of a small cell (a cell associated with a second BS) and addition/modification/removal of DRBs through the second BS.

Before a step of transmitting a bearer establishment request message, a step in which the first BS according to still another embodiment of the present invention transmits, to the second BS, transmits a secondary cell addition modification request message including at least one of message type information, second BS ID information, secondary cell ID information, and secondary cell index information; and a step in which the first BS according to still another embodiment of the present invention receives, from the second BS, a secondary cell addition modification response message including at least one of cell ID information associated with the second BS, second BS cell index information, random access channel preamble information of the second BS cell, and radio resource configuration information of the second BS cell, may be further included.

Figure 7:
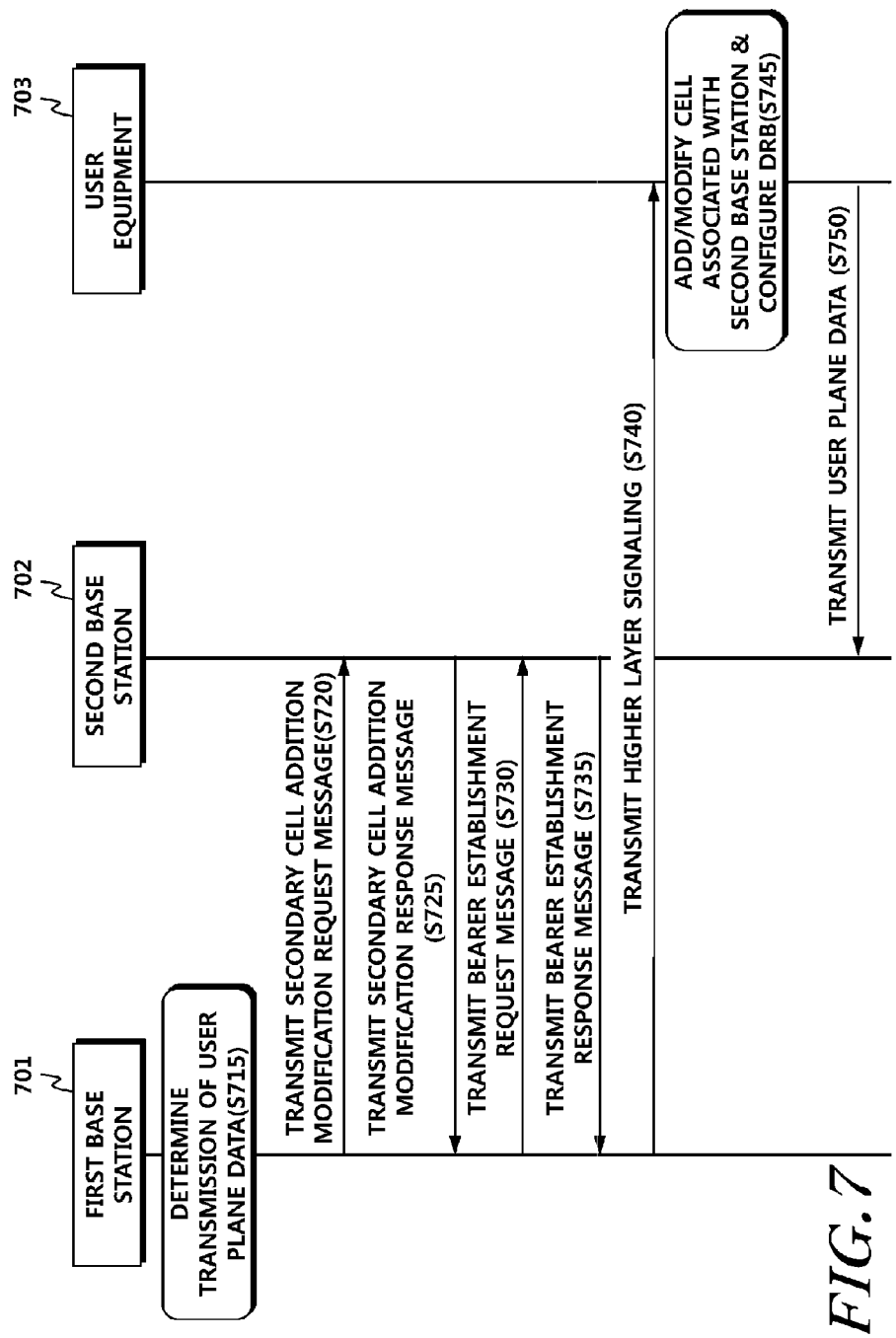
FIG. 7 is a signal flow diagram illustrating operations of a base station and a user equipment according to yet another embodiment of the present invention.

FIG. 7 is a signal flow diagram illustrating operations of a BS 701 and a UE 703 according to yet another embodiment of the present invention.

Respective steps will be described in detail with reference to FIG. 7.

In Step S715 the first BS 701 determines the transmission of user plane data through a radio bearer of the second BS cell on the basis of at least one of measurement reporting information and data load information.

Specifically, in step S715, the first BS 701 may determine a procedure in which, in order to transmit user plane data through the second BS 702, a small cell is added, modified, or removed, or DRBs are added, modified, or removed through the second BS 702.

In this case, the first BS 701 may determine a DRB to be served through the first BS 701 and a DRB to be served through the second BS 702, by using at least one of information (e.g., an E-RAB level QoS parameter) within an initial context setup request message received from an MME, measurement reporting information, and data load information, and may start bearer establishment signaling for transmitting user plane data to the second BS 702. Specifically, the first BS 701 may select an E-RAB, which is intended to be transmitted through the second BS 702, in view of load information of the first BS 701, measurement reporting information, and the like on the basis of a QoS parameter (e.g., a QCI, an allocation and retention priority, and GBR QoS) for each E-RAB. For example, a GBR bearer or an E-RAB, which has a particular QCI or a particular allocation and retention priority value, may be transmitted through the first BS 701, and a request for establishing a DRB may not be sent to the second BS 702.

In step S720, the first BS 701 transmits, to the second BS 702, a secondary cell addition modification request message for adding/modifying a small cell.

Alternatively, in step S720, when the first BS 701 determines addition/modification of a small cell on the basis of measurement reporting or in an RRC-connected state, the first BS 701 may transmit, to the second BS 702, the secondary cell addition modification request message for adding/modifying a small cell.

Specifically, for example, the secondary cell addition modification request message may include at least one information among the following information.

A message type: may include information for identifying the procedure type of a message.
A first BS UE X2AP ID: may include ID information assigned by the first BS 701.
A cell (small cell) ID associated with the second BS 702: may include information on an ECGI or a PCI of the second BS cell.
A second BS cell (small cell) index: may include index information for identifying each second BS cell (small cell) or each SCell within SCells configured for the UE 703, within second BS cells (small cells) configured for the UE 703, within second BS cells (small cells) configured as a SCell for the UE 703, or within SCells configured by using a second BS cell for the UE 703.

In step S725, the second BS 702, which has received the secondary cell addition modification request message including the information, may transmit a secondary cell addition modification response message to the first BS 701.

Specifically, in step S725, the second BS 702, which has received the secondary cell addition modification request message including small cell addition/modification request information from the first BS 701, may transmit a secondary cell addition modification response message to the first BS 701.

For example, the secondary cell addition modification request message may include at least one information among the following information.

A message type: may include information for identifying the procedure type of a message.
A first BS UE X2AP ID: may include ID information assigned by the first BS 701.
A second BS UE X2AP ID: may include ID information assigned by the second BS 702.
A cell (small cell) ID associated with the second BS 702: may include information on a PCI and an ARFCN of a cell associated with the second BS.
A second BS cell (small cell) index: is an index used to identify each second BS cell (small cell) or each SCell within SCells configured for the UE 703, within second BS cells (small cells) configured as a SCell for the UE 703, or within SCells configured by using a second BS cell for the UE 703, and may be determined or assigned by the second BS 702.

In another method, the first BS 701 may determine or assign the second BS cell (small cell) index or SCell index, may include the second BS cell index in a secondary cell addition modification request message, and may transmit the secondary cell addition modification request message including the second BS cell index. At this time, the second BS cell index may not be included in a secondary cell addition modification response message.

In still another method, the first BS 701 may determine or assign the second BS cell index or SCell index, may include the second BS cell index in the secondary cell addition modification request message, and may transmit the secondary cell addition modification request message including the second BS cell index. At this time, the second BS cell index may also be included in the secondary cell addition modification response message.

In yet another method, the second BS cell index or SCell index may use a value (e.g., 8) different from a value (e.g., 1 to 7) used as the existing SCell index so as to distinguish a second BS cell from a SCell of the first BS 701. In this case, the second BS cell index may not be included in both the secondary cell addition modification request message and the secondary cell addition modification response message. Alternatively, the second BS cell index may be included in the secondary cell addition modification request message and/or the secondary cell addition modification response message.

In order to use a different value from a value used as the existing SCell index, a SCell index, which may currently have an integer value of 1 to 7, may have an integer value of 1 to 14, integer values from 1 to 7 may be used as indices for SCells of the first BS, and 8 to 14 may be used as indices for cells of the second BS 702. In still yet another method, a SCell index and a field named "second BS ID (or second BS cell ID)" may be transmitted together so as to enable a SCell index of the first BS 701 to be distinguished from a SCell index of the second BS 702.

Small cell common radio resource configuration information: is information essential to allow the UE 701 to operate in a cell associated with the second BS 702, and may include information on a physical layer configuration parameter, or the physical layer configuration parameter and an MAC layer configuration parameter which correspond to system configuration information.

Small cell dedicated radio resource configuration information: may include UE-specific configuration information (physical channel configuration) on a cell associated with the second BS 702, or may include information on the UE-specific configuration information (physical channel configuration) and an MAC layer configuration parameter (e.g., mac-MainConfig) with respect to the cell associated with the second BS 702.

Selectively, a dedicated RACH preamble information: may include information related to a preamble for performing a contention-free random access procedure through a cell of the second BS 702.

As described above, the first BS 701 may transmit, to the second BS 702, the secondary cell addition modification request message including the information, and may receive the secondary cell addition modification response message including the information.

When the first BS 701 determines the transmission of user plane data through the second BS 702 (e.g., when determining the addition/modification of DRBs to/in a cell associated with the second BS), in step S730, the first BS 701 transmits a bearer establishment request message to the second BS 702 in order to transmit user data before or after starting a security activation procedure. Alternatively, in step S730, in order to transmit user data through a cell (small cell) associated with the second BS 702 in an RRC-connected state, the first BS 701 transmits a bearer establishment request message to the second BS 702. Alternatively, in step S730, in order to transmit user data through the first BS 701 and the second BS 702, the first BS 701 transmits a bearer establishment request message to the second BS 702.

The bearer establishment request message for transmitting user plane data through the second BS 702 may include at least one information among the following information.

An example of information included in the bearer establishment request message will be described below.

A message type: may include information for identifying the procedure type of a message.

A first BS UE X2AP ID: may include ID information assigned by the first BS.

A cell (small cell) ID associated with the second BS 702: may include a ECGI or a PCI of a cell associated with the second BS 702.

A second BS cell (small cell) index: may include index information for identifying each second BS cell (small cell) or each SCell within SCells configured for the UE 703, within second BS cells (small cells) configured for the UE 703, within second BS cells (small cells) configured as a SCell for the UE 703, or within SCells configured by using a second BS cell for the UE 703.

UE context information: UE context information may include the following information.

1) UE security capabilities: includes information on an algorithm that supports ciphering and integrity protection within the UE 703. Alternatively, the UE 703 security capabilities include information on an algorithm that supports ciphering within the UE 703. Alternatively, the UE 703 security capabilities include information on an algorithm that supports the ciphering of user plane data within the UE 703. In another method, the UE 703 security capabilities information may not be included in the bearer establishment request message, and may be managed only by the first BS 701.

2) AS security information or an AS security key: the second BS 702 includes ciphering key ($K_{UPenc}$) information on user plane data. Alternatively, the AS security information or AS security key includes BS key ($K_{eNB}$) information for deriving a ciphering key ($K_{UPenc}$). The above-described information may use a value identical to that of $K_{UPenc}$ or $K_{eNB}$ of the first BS 701, or may use a value different from that of $K_{UPenc}$ or $K_{eNB}$ of the first BS 701.

3) A UE-AMBR: is a maximum bit rate set applied to all non-GBR bearers per UE 703, is defined in a UL or DL direction, and is a value provided from an MME to the first BS 701. Alternatively, for example, when the first BS 701 forwards user plane data through the second BS 702, the UE-AMBR information may not be included in the bearer establishment request message, and may be managed only by the first BS 701. When all non-GBR bearers configured for a particular UE 703 are configured through the second BS 702, the UE-AMBR may be included. Alternatively, when at least one non-GBR bearer configured for a particular UE 703 is configured through the second BS 702, the UE-AMBR may be included. Alternatively, when at least one non-GBR bearer configured for a particular UE 703 is configured through the second BS 702, the UE-AMBR and processing ratio information of the UE-AMBR through the second BS may be included.

4) E-RABs setup list (E-RABs to be setup list) information through the second BS 702: includes an E-RABs setup item. The E-RABs setup item may include at least one of an E-RAB ID, an E-RAB level QoS parameter, and GTP tunnel endpoint information.

Information that may be included in the E-RABs setup item is described in detail. The E-RAB ID includes information for identifying a radio access bearer for the UE 701. Also, the E-RAB level QoS parameter is QoS information applied to an E-RAB, and includes a QCI, an allocation and retention priority, and GBR QoS information. Further, for example, when user plane data is transmitted through the interface between the first BS 701 and the second BS 702 as illustrated in FIG. 2, the GTP tunnel endpoint is an endpoint of a bearer for transmitting the user plane data between the first BS 701 and the second BS 702, and may include a transport layer address, which is an Internet protocol (IP) address of the first BS 701, and a GTP Tunnel Endpoint ID (TEID). Alternatively, as another example, when user plane data is transmitted through the interface between the S-GW and the second BS 702 as illustrated in FIG. 3, the GTP tunnel endpoint is an endpoint between the S-GW and the second BS 702, and may include a transport layer address, which is an IP address of the S-GW, and a GTP TEID.

5) UE capability information: includes UE capability information, which is required to configure radio resources for transmitting user data through the second BS 702, in UE capability information included in UE context information received through an MME. For example, the UE capability information includes information on single Tx/Rx or multi Tx/Rx, and the like.

As described above, the bearer establishment request message may include at least one of the multiple information described.

In step S735, the first BS 701, according to an embodiment of the present invention, may receive a bearer establishment response message from the second BS 702.

In step S735, the second BS 702, which has received, from the first BS 701, the bearer establishment request message for transmitting user plane data, transmits the bearer establishment response message to the first BS 701.

Specifically, the bearer establishment response message may include at least one of the information.

A message type: is information for identifying the procedure type of a message.

A first BS UE X2AP ID: is ID information assigned by the first BS 701.

A second BS UE X2AP ID: is ID information assigned by the second BS 702.

A cell (small cell) ID associated with the second BS 702: includes an ECGI or PCI information of a cell associated with the second BS 702.

A second BS cell (small cell) index: includes index information for identifying each second BS cell (small cell) or each SCell within SCells configured for the UE 703, within second BS cells (small cells) configured for the UE 703, within second BS cells (small cells) configured as a SCell for the UE 703, or within SCells configured by using a second BS cell for the UE 703.

E-RABs admitted list information through the second BS 702: may include E-RABs admitted item information. The E-RABs admitted item information may include at least one of an E-RAB ID, a GTP tunnel endpoint, a DRB ID, PDCP configuration information (PDCP-Config), RLC configuration information (RLC-Config), a logical channel identity (logicalChannelIdentity), logical channel configuration information (logicalChannelConfig), and physical channel configuration information (PhysicalConfigDedicated).

Specifically, the E-RAB ID includes information for identifying a radio access bearer for the UE 703. Also, when user plane data is transmitted through the interface between the first BS 701 and the second BS 702 as illustrated in FIG. 2, the GTP tunnel endpoint is an endpoint of a bearer between the first BS 701 and the second BS 702. Alternatively, when user plane data is transmitted through the interface between the S-GW and the second BS 702 as illustrated in FIG. 3, the GTP tunnel endpoint is an endpoint between the S-GW and the second BS 702, and includes a transport layer address, which is an IP address of the second BS 702, and a GTP TEID. When user plane data is transmitted through the interface between the S-GW and the second BS 702 as illustrated in FIG. 3, the PDCP configuration information (PDCP-Config) represents PDCP layer configuration information for a radio bearer that is transmitted through the second BS 702. The RLC configuration information (RLC-Config) represents RLC layer configuration information for a radio bearer that is transmitted through the second BS 702. The logical channel identity (logicalChannelIdentity) and the logical channel configuration information (logicalChannelConfig) represent logicalChannelIdentity and logicalChannelConfig, respectively, for a radio bearer that is transmitted through the second BS 702. The physical channel configuration information (PhysicalConfigDedicated) represents physical layer configuration information for a radio bearer that is transmitted through the second BS 702.

E-RABs not admitted list information: includes list information of a radio bearer which may not be processed among radio bearers requested through the second BS 702 according to the load, state, or the like of the second BS 702. For example, when traffic load is high and all requested bearers are not processed, the second BS 702 may include a list of all the requested bearers in the E-RABs not admitted list, or may deliver a message (e.g., a reject message) of a different message type.

Selectively, dedicated RACH preamble information: includes preamble information for performing a contention-free random access procedure through a cell of the second BS 702.

The bearer establishment response message may include at least one information among the information.

In step S740, the first BS 701 may include information on a cell, which is associated with the second BS 702 and is to be added/modified, in higher layer signaling (e.g., an RRC connection reconfiguration message), and may transmit, to the UE 703, the higher layer signaling including the information on the cell.

The UE 703 may add/modify the cell associated with the second BS 702 on the basis of the information included in the received higher layer signaling.

The information on the cell, which is associated with the second BS 702 and is to be added/modified, may be established on the basis of information included in the secondary cell addition modification response message.

Hereinafter, a detailed description will be made of an example of information that may be included in the information on the cell that is associated with the second BS 702 and is to be added/modified.

A cell (small cell) ID associated with the second BS 702: may include information on a PCI and an ARFCN of a small cell of the second BS 702.

A second BS cell (small cell) index: includes index information used to identify each second BS cell (small cell) or each SCell within SCells or a second BS cell configured for the UE 703, within second BS cells (small cells) configured for the UE 703, within second BS cells (small cells) configured as a SCell for the UE 703, or within SCells configured by using a second BS cell (small cell) for the UE 703.

The above-described index information may be determined or assigned by the second BS 702.

In another method, the first BS 701 may determine or assign the second BS cell (small cell) index, may include the second BS cell (small cell) index in a secondary cell addition modification request message, and may transmit the secondary cell addition modification request message including the second BS cell (small cell) index. The second BS cell (small cell) index may not be included in the secondary cell addition modification response message.

In still another method, the first BS 701 may determine or assign the second BS cell (small cell) index, may include the second BS cell (small cell) index in the secondary cell addition modification request message, and may transmit the secondary cell addition modification request message including the second BS cell (small cell) index. Also, the second BS 702 may confirm that the secondary cell addition modification request message includes the second BS cell (small cell) index, and then may include the second BS cell (small cell) index in the secondary cell addition modification response message.

In yet another method, the second BS cell (small cell) index or SCell index may use a value (e.g., 8) different from a value (e.g., 1 to 7) used as the existing SCell index so as to distinguish a second BS cell from a SCell of the first BS 701. In this case, the second BS cell index may not be included in both the secondary cell addition modification request message and the secondary cell addition modification response message.

In still yet another method, the second BS cell (small cell) index or SCell index may use a value (e.g., 8) different from a value (e.g., 1 to 7) used as the existing SCell index so as to distinguish a second BS cell from a SCell of the first BS 701, and may be included in the secondary cell addition modification request message and/or the secondary cell addition modification response message.

In order to use a different value from a value used as the existing SCell index, a SCell index, which may currently have an integer value of 1 to 7, may have an integer value of 1 to 14, integer values from 1 to 7 may be used as indices for SCells of the first BS 701, and 8 to 14 may be used as indices for cells of the second BS 702. In further another method, a SCell index and a field named "second BS ID (or second BS cell ID)" may be transmitted together so as to enable a SCell index of the first BS 701 to be distinguished from a SCell index of the second BS 702.

Small cell common radio resource configuration information: is information essential to allow the UE 703 to operate in a cell associated with the second BS 702, and may include a physical layer configuration parameter, or the physical layer configuration parameter and an MAC layer configuration parameter which correspond to system configuration information.

Small cell dedicated radio resource configuration information: may include UE-specific configuration information (physical channel configuration) for operating in a cell associated with the second BS 702, or may include information on the UE-specific configuration information and an MAC layer configuration parameter (e.g., mac-MainConfig).

In step S745, the UE 703 may receive the higher layer signaling including the information, and may add/modify a cell (small cell) associated with the second BS 702.

Hereinafter, a detailed description will be made of a case where the UE 703 receives information for establishing a DRB between the UE 703 and the second BS 702.

In step S740, after the first BS 701 completes a bearer establishment signaling procedure between the first BS 701 and the second BS 702 for transmitting user plane data (e.g., after receiving the bearer establishment response message), the first BS 701 may include information on DRBs, which are to be added/modified in higher layer signaling (e.g., an RRC connection reconfiguration message), and may transmit to the UE 703 the higher layer signaling including the information on the DRBs.

The UE 703 may add/modify DRBs between the UE 703 and the second BS 702 or may modify DRBs of the first BS 701 to DRBs of the second BS 702. Alternatively, the UE 703 may modify the DRBs of the first BS 701 to DRBs through the first BS 701 and the second BS 702.

The above-described information on DRBs to be added/modified may include at least one information among the following information.

EPS-Beareridentity: is an EPS bearer ID and may include E-RAB ID information.

A cell (small cell) ID associated with the second BS 702: may include information on a PCI and an ARFCN of a cell associated with the second BS 702.

A second BS cell (small cell) index: includes index information used to identify each second BS cell (small cell) or each SCell within SCells configured for the UE 703, within second BS cells (small cells) configured for the UE 703, within second BS cells (small cells) configured as a SCell for the UE 703, or within SCells configured by using a second BS cell (small cell) for the UE 703.

DRB-ID: includes DRB-ID information received from the second BS 702.

PDCP-Config: includes PDCP-Config information received from the second BS 702.

RLC-Config: includes RLC-Config information received from the second BS 702.

logicalChannelIdentity: includes information on a logical channel ID.

logicalChannelConfig: includes information on logical channel configuration information received from the second BS 702.

In another method, in step S740, after the first BS 701 starts a bearer establishment signaling procedure for transmitting user plane data or for establishing DRBs between the first BS 701 and the second BS 702 (e.g., after transmitting the bearer establishment request message to the second BS 702 in step S730), the first BS 701 includes information on DRBs, which are to be added/modified, in higher layer signaling (e.g., an RRC connection reconfiguration message), and transmits, to the UE 703, the higher layer signaling including the information on the DRBs.

In step S745, based on the information included in the received higher layer signaling, the UE 703 may add/modify DRBs between the UE 703 and the second BS 702, or may add/modify DRBs of the first BS 701 to DRBs of the second BS 702.

For example, the information on DRBs to be added/modified may include at least one information among the following information.

EPS-Beareridentity: is an EPS bearer ID and may include E-RAB ID information.

A cell (small cell) ID associated with the second BS 702: may include information on a PCI and an ARFCN of a cell associated with the second BS 702.

A second BS cell (small cell) index: may include index information used to identify each second BS cell (small cell) or each SCell within SCells configured for the UE 703, within second BS cells (small cells) configured for the UE 703, within second BS cells (small cells) configured as a SCell for the UE 703, or within a SCell configured by using a second BS cell (small cell) for the UE 703.

DRB-ID: may include DRB-ID information that the first BS 701 determines and delivers to the second BS 702.

PDCP-Config: includes PDCP-Config information that the first BS 701 determines and delivers to the second BS 702.

RLC-Config: includes RLC-Config information that the first BS 701 determines and delivers to the second BS 702.

logicalChannelIdentity: includes information on a logical channel ID.

logicalChannelConfig: includes information on logical channel configuration information.

Also, the higher layer signaling transmitted to the UE 703 as described above may further include identification information for distinguishing a small cell provided by the second BS 702 from a macro cell provided by the first BS 701, together with information on a DRB to be added/modified or information on a DRB to be released. Further, DRB information configured through the second BS 702 may include at least one of information that allows the UE 703 to distinguish the first BS 702 from the second BS 702 in an MAC layer, and information that allows the UE 703 to distinguish a cell provided by the first BS 702 from a cell provided by the second BS 702 in the MAC layer.

For example, when DRBs previously configured through the first BS 701 are added/modified through the second BS 702, information on a DRB to be added/modified may include a small cell ID of the second BS 702.

Also, information (DRB-ToAddMod) on information a DRB to be released may include information on a DRB to be released in a macro cell and macro cell ID information of the first BS 701.

In another method, the DRB to be added/modified may include the second BS cell (small cell) index or a SCell index.

Hereinafter, when the first BS 701, according to an embodiment of the present invention, includes DRB information in higher layer signaling and transmits the higher layer signaling including the DRB information. A detailed description will be made of subjects that determine respective parameters of the included information.

Higher layer signaling according to an embodiment of the present invention may further include information for configuring a cell associated with the second BS 702, and the information for configuring the cell associated with the second BS 702 may be information that the second BS 702 establishes and transmits to the first BS 701. Specifically, the second BS 702 cell index information and the DRB information configured through the second BS 702 may be information that the second BS 702 establishes and transmits to the first BS 701.

Also, the information for configuring the cell associated with the second BS 702 may be established by the first BS 701 on the basis of at least one of measurement reporting information, data load information of the first BS, and a bearer establishment response message.

A specific example of each case will be described.

1) A Method in which the Second BS 702 Makes a Determination

The first BS 701 may include, in a bearer establishment request message, at least one of information (e.g., UE context information, such as an E-RABs list and the like) included in an initial context setup request message received from an MME, measurement reporting information, and data load information, and may deliver, to the second BS 702, the bearer establishment request message including the at least one information.

The second BS 702 may determine parameters included in the higher layer signaling on the basis of the delivered information. Specifically, the second BS 702 may determine parameters included in second BS cell index information and DRB information configured through second BS 702, or respective information on the basis of the delivered information.

The determined parameter information may be transmitted to the first BS 701, and may be transmitted to the UE 703 through higher layer signaling (e.g., an RRC connection reconfiguration message).

2) A Method in which the First BS 701 Makes a Determination

The first BS 701 may determine the parameters on the basis of at least one of information (e.g., an E-RABs list) within an initial context setup request message received from the MME, measurement reporting information, and data load information. Specifically, the parameters (e.g., PDCP configuration information, RLC configuration information, MAC configuration information, etc.), which are included in higher layer signaling (e.g., an RRC connection reconfiguration message), may be determined by the first BS 701.

3) Another method in which the first BS 701 makes a determination

The first BS 701 may determine the parameters on the basis of a bearer establishment response message, which has been received from the second BS 702, and at least one of information (e.g., an E-RABs list) within an initial context setup request message received from the MME, measurement reporting information, and data load information.

As described above, the UE 703 may receive, from the first BS 701, the related information for accessing a cell associated with the second BS 702, and may perform a random access procedure for UL synchronization between the UE 703 and the second BS 702.

After the first BS 702 completes a bearer establishment signaling procedure between the first BS 701 and the second BS 702 for transmitting user plane data (e.g., after receiving the bearer establishment response message), the first BS 701 may transmit random access-related information for UL synchronization of the UE 703 through higher layer signaling (e.g., an RRC connection reconfiguration message).

The first BS 701 may further include, in the higher layer signaling, at least one of cell identification information associated with the second BS 702, second BS cell system information, second BS 702 dedicated MAC layer configuration information, and a random access channel preamble of the second BS cell, which enable the UE 703 to perform UL synchronization with a cell (small cell) associated with the second BS 702 and to access the cell (small cell) associated with the second BS 702 through a RACH. Then, the first BS 701 may transmit the higher layer signaling further including the at least one information.

In the above example, a case has been described in which the related information for accessing the cell associated with the second BS 702 is transmitted through higher layer signaling. However, the related information may be transmitted in a step separate from that of transmission of higher layer signaling.

After the UE receives the higher layer signaling (e.g., an RRC connection reconfiguration message) including radio resource configuration information of the cell (small cell) associated with the second BS 702, the UE 703 performs synchronization with the cell associated with the second BS 702. When the higher layer signaling includes the dedicated random access channel preamble information, the UE 703 may perform a random access procedure according to a contention-free procedure. In contrast, when the higher layer signaling does not include the dedicated random access channel preamble, the UE 703 performs the random access procedure according to a contention-based procedure.

For example, when the UE 703 performs the random access procedure according to a contention-free procedure, the UE 703 may perform the random access procedure by transmitting a RACH preamble, which has been generated by the cell associated with the second BS 702 and has been received through the first BS 701, to the second BS cell, and receiving a RACH response message (i.e., a RAR) from the second BS cell in response to the transmitted RACH preamble.

With respect to the higher layer signaling (e.g., an RRC connection reconfiguration message), one message may include, together, information on a cell (small cell), which is associated with the second BS 702 and is to be added/modified, information on DRBs to be added/modified, and random access-related information for UL synchronization, or each individual message, which includes the at least one information, may be transmitted. For example, after the first BS 701 transmits the secondary cell addition modification request message in step S720 and receives the secondary cell addition modification response message in step S725, in step S740, the first BS 701 may transmit, to the UE 703, higher layer signaling for adding a cell associated with the second BS 702. Then, the first BS 701 may transmit the bearer establishment request message in step S730, may receive the bearer establishment response message in step S735, and may perform another transmission of higher layer signaling.

In step S750, the UE 703 transmits user plane data through DRBs established between the UE 703 and the second BS 702.

As described above, the respective embodiments, in which the first BS 701 controls the transmission of user plane data by the UE 703, have been described in detail.

Hereinafter, operations of a first BS 701 and a UE 701 in a case where user plane data is transmitted will be described with reference to FIGS. 8 and 9.

Figure 8:
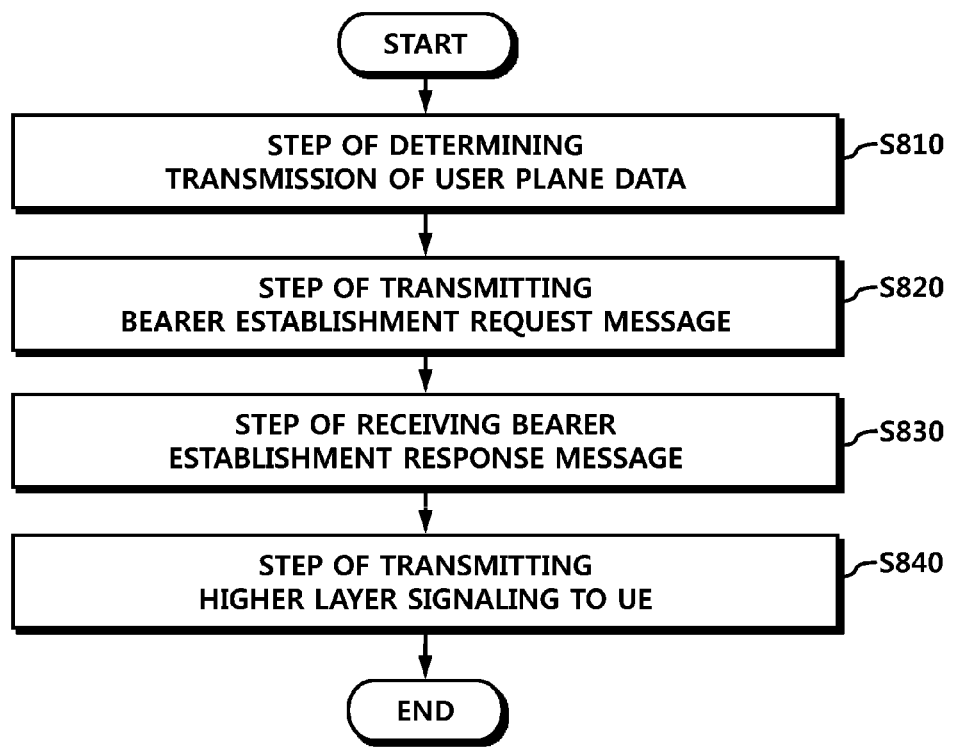
FIG. 8 is a view illustrating an operation of a base station according to still yet another embodiment of the present invention.

FIG. 8 is a view illustrating an operation of a BS according to still yet another embodiment of the present invention.

In step S810, as described above, the first BS 701 according to an embodiment of the present invention may select a radio bearer configured through the second BS 702, on the basis of at least one of load information of the first BS 701 and measurement report information, and may determine the transmission of user plane data.

In step S820, when the transmission of use plane data through the second BS 702 is determined, the first BS 701 transmits a bearer establishment request message to the second BS 702.

The bearer establishment request message may include at least one of first BS UE X2AP ID information, cell ID information associated with the second BS 702, second BS cell index information, a UE-AMBR, and E-RABs setup list information.

In step S830, the first BS 701 receives a bearer establishment response message from the second BS 702.

The bearer establishment response message may include at least one of cell ID information associated with the second BS 702, second BS cell index information, random access channel preamble information of a second BS cell, second BS cell system information, second BS cell dedicated MAC layer configuration information, E-RABs admitted list information, and second BS DRB configuration information on the admitted E-RAB.

In step S840, the first BS 701 may transmit higher layer signaling to the UE 703.

The higher layer signaling may include at least one of cell ID information of a cell associated with the second BS 702, second BS cell index information, and DRB information configured through the second BS 702. Also, the higher layer signaling may further include at least one of second BS cell system information, second BS dedicated MAC layer configuration information, and a random access channel preamble of a second BS cell. The respective information parameters (or detailed information) included in the higher layer signaling are as described in the above example.

Meanwhile, the DRB information configured through the second BS 702 may include at least one of information that allows the UE 703 to distinguish the first BS 701 from the second BS 702 in an MAC layer, and information that allows the UE 703 to distinguish a cell provided by the first BS 701 from a cell provided by the second BS 702 in the MAC layer.

The first BS 701 according to another embodiment of the present invention may transmit, to the UE 703, information required for random access for UL synchronization between the UE 703 and the second BS 702. The information may be included together in the higher layer signaling, or may be transmitted in a separate message form.

As described in the embodiment of the present invention, before a step in which the first BS 71 according to still another embodiment of the present invention transmits a bearer establishment request message. A step in which the first BS 701 transmits, to the second BS 702, a secondary cell addition modification request message including at least one of message type information, second BS ID information, cell ID information associated with the second BS 702, and second BS cell index information. A step in which the first BS 701 receives, from the second BS 702, a secondary cell addition modification response message including at least one of cell ID information associated with the second BS 702, second BS cell index information, random access channel preamble information of the second BS cell, and second BS cell radio resource configuration information, may be further included.

Figure 9:
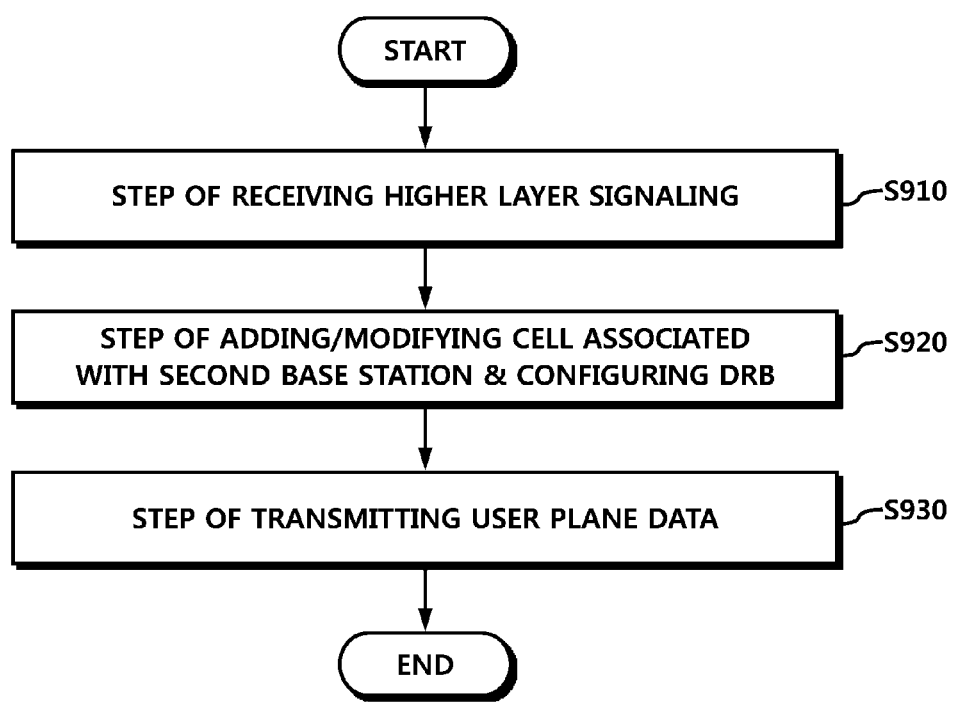
FIG. 9 is a view illustrating an operation of a user equipment according to further another embodiment of the present invention.

FIG. 9 is a view illustrating an operation of a UE 703 according to further another embodiment of the present invention.

A method, in which the UE 703 according to further another embodiment of the present invention controls transmission of user plane data, may include step S910 in which the UE 703 receives, from the first BS 701, higher layer signaling including at least one of cell ID information of a cell associated with the second BS 702, second BS cell index information, and DRB information configured through the second BS 702. Also, the method may include step S920 in which the UE 703 adds or modifies the cell associated with the second BS 702 on the basis of the received higher layer signaling, and configures a DRB for transmitting the user plane data. In step S930, the UE 703 may transmit the user plane data by using the configured DRB.

In configuring the DRB for transmitting the user plane data, the UE 703 may configure the DRB in such a manner as to distinguish an MAC entity for the first BS 701 from an MAC entity for the second BS 702 in an MAC layer. Also, the UE 703 may configure the MAC entity for the second BS 702 in such a manner as to discriminate between a scheduling/priority handling entity and a multiplexing entity for a radio bearer configured through the second BS 702.

DRB information configured through the second BS 702 may include at least one of information that allows the UE 703 to distinguish the first BS 701 from the second BS 702 in an MAC layer, and information that allows the UE 703 to distinguish a cell provided by the first BS 701 from a cell provided by the second BS 702 in the MAC layer.

Also, the UE 703 according to another embodiment of the present invention may perform a random access procedure for UL synchronization between the UE 703 and a cell associated with the second BS 702 upon receiving higher layer signaling which includes at least one of cell identification information associated with the second BS 702 which allows the UE 703 to access a cell associated with the second BS 702, second BS cell system information, random access channel preamble information of the second BS cell, and UE-specific configuration information including second BS 702 dedicated MAC layer configuration information.

In this case, information for accessing the cell associated with the second BS 702 may be received together with information for adding/modifying a small cell or a DRB.

Hereinafter, a description will be made of a structure of a protocol for transmitting user plane data and a hierarchical structure of a BS or a UE according to the present invention.

Figure 10:
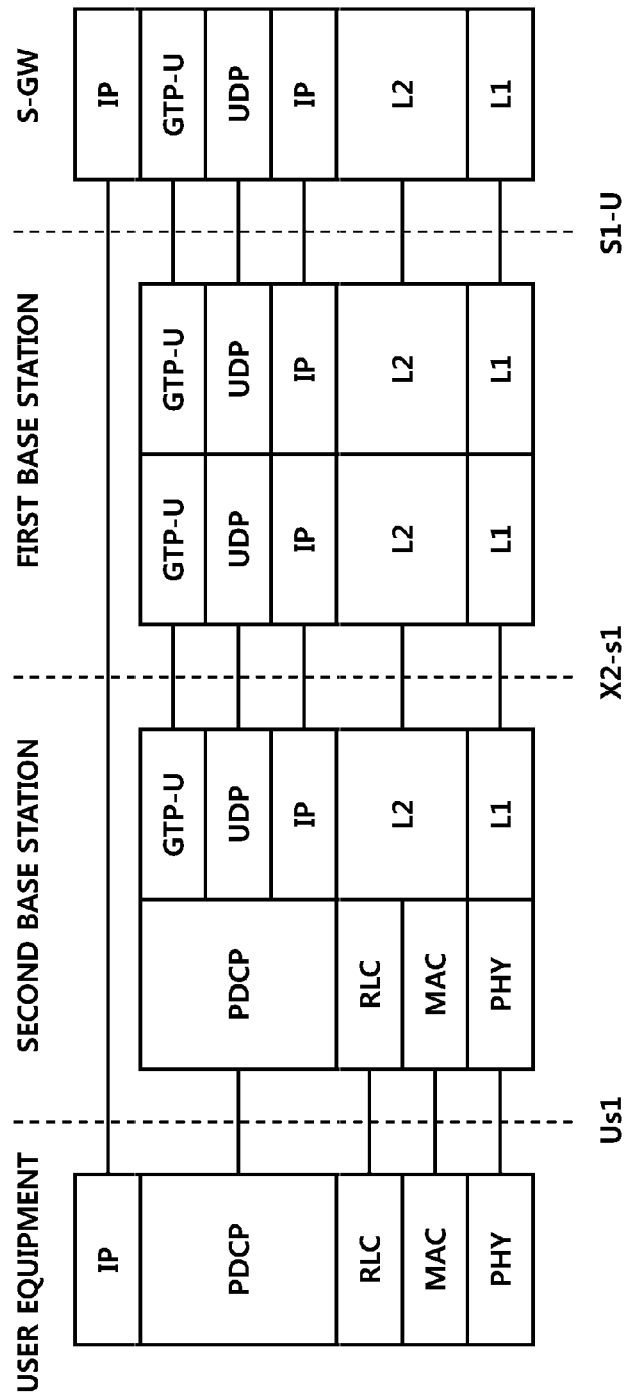
FIG. 10 is a view illustrating an example of a structure of a protocol for transmitting user plane data through an interface of a second base station according to the present invention.

FIG. 10 is a view illustrating an example of a structure of a protocol for transmitting user plane data through an interface of a second BS according to the present invention.

The above-described method for transmitting user plane data, according to the present invention, may be applied to the structure of the protocol for transmitting user plane data, as illustrated in FIG. 10.

Figure 11:
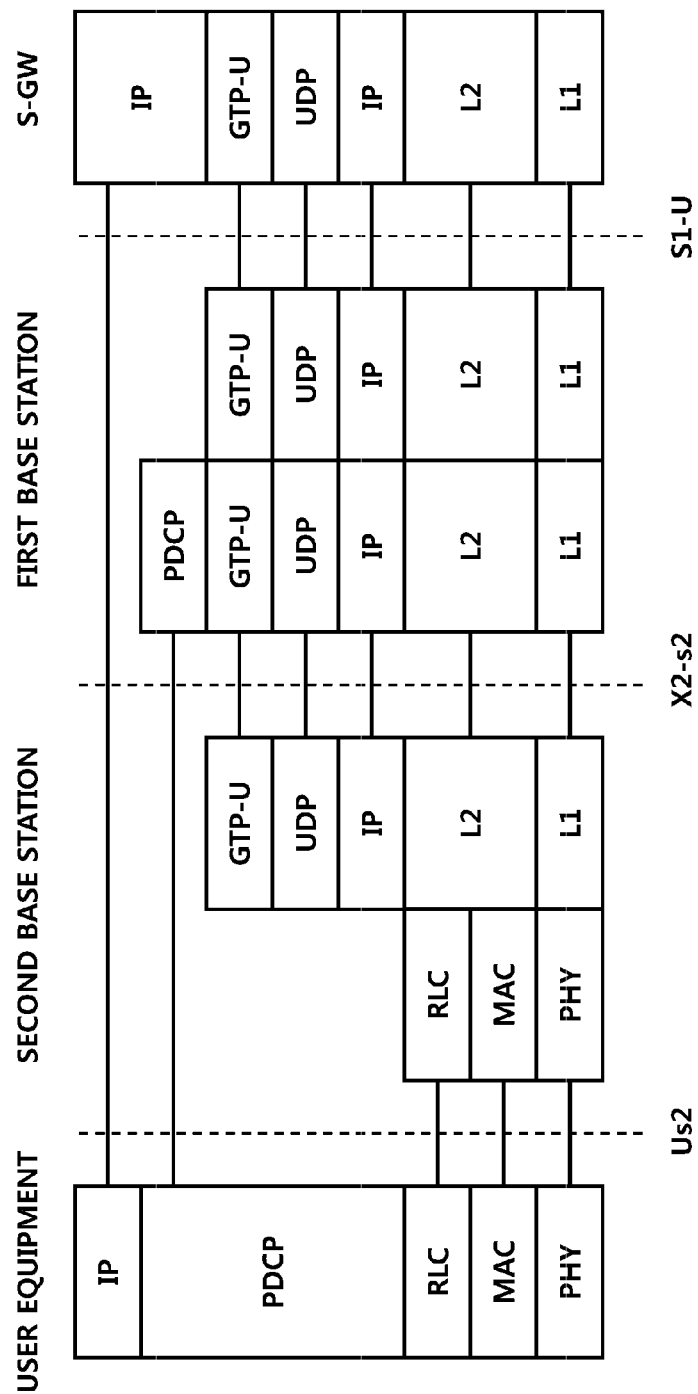
FIG. 11 is a view illustrating another example of a structure of a protocol for transmitting user plane data through an interface of a second base station according to the present invention.

FIG. 11 is a view illustrating another example of a structure of a protocol for transmitting user plane data through an interface of a second BS according to the present invention.

The above-described method for transmitting user plane data, according to the present invention, may also be applied to the protocol structure of FIG. 11 for transmitting user plane data.

The protocol structure illustrated in FIG. 11 may be applied to a case where the first BS forwards user plane data to the second BS and the second BS the user plane data transmits to the UE as illustrated in FIG. 2.

Figure 12:
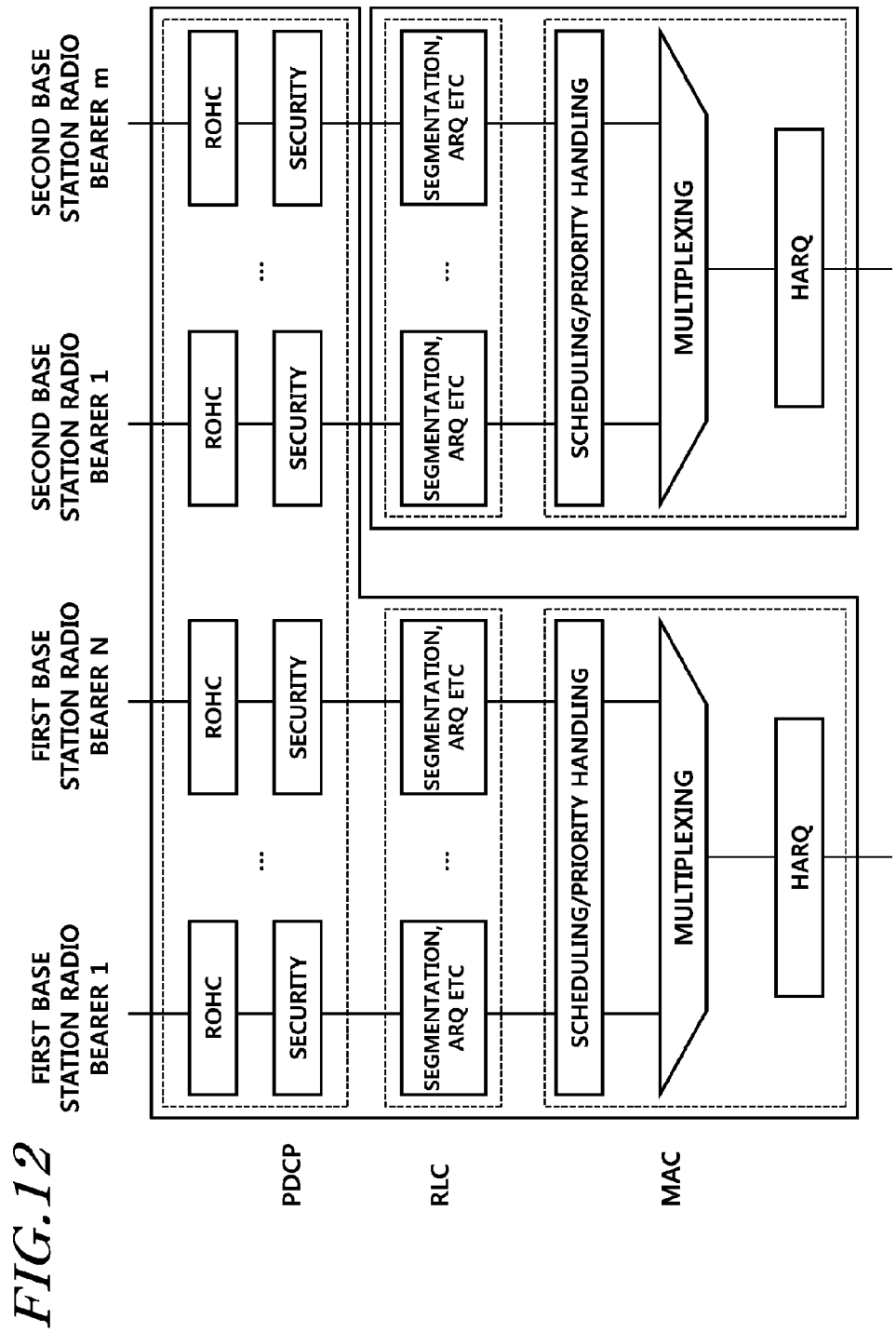
FIG. 12 is a view illustrating an example of a Layer 2 structure of a first base station and a second base station according to the present invention.

FIG. 12 is a view illustrating an example of a Layer 2 structure of a first BS and a second BS according to the present invention.

FIG. 12 specifically illustrates a Layer 2 protocol structure of a first BS and a second BS in a case where the protocol structure illustrated in FIG. 11 is used.

Referring to FIG. 12, the first BS may distinguish a PDCP entity, which is to deliver user data to the first BS in a unit of radio bearer in a PDCP layer, from a PDCP entity, which is to deliver user data to the second BS in the unit of radio bearer in the PDCP layer, (or a PDCP entity which is to deliver user data to the first BS and the second BS). Accordingly, the PDCP layer may have a function capable of performing switching (or routing) on a PDCP Protocol Data Unit (PDU) which is to be delivered to the second BS.

The second BS has one Hybrid Automatic Repeat reQuest (HARQ) entity for processing a cell associated with the second BS. When the first BS supports the existing CA technology, the first BS may have multiple HARQ entities. When the second BS supports the existing CA technology, the second BS may also have multiple HARQ entities.

When the above-described method is applied to the protocol structure illustrated in FIG. 11, a bearer establishment request message for transmitting user plane data through the second BS does not need to include AS security information or AS security key information, and a bearer establishment response message does not need to include PDCP-Config information.

Figure 13:
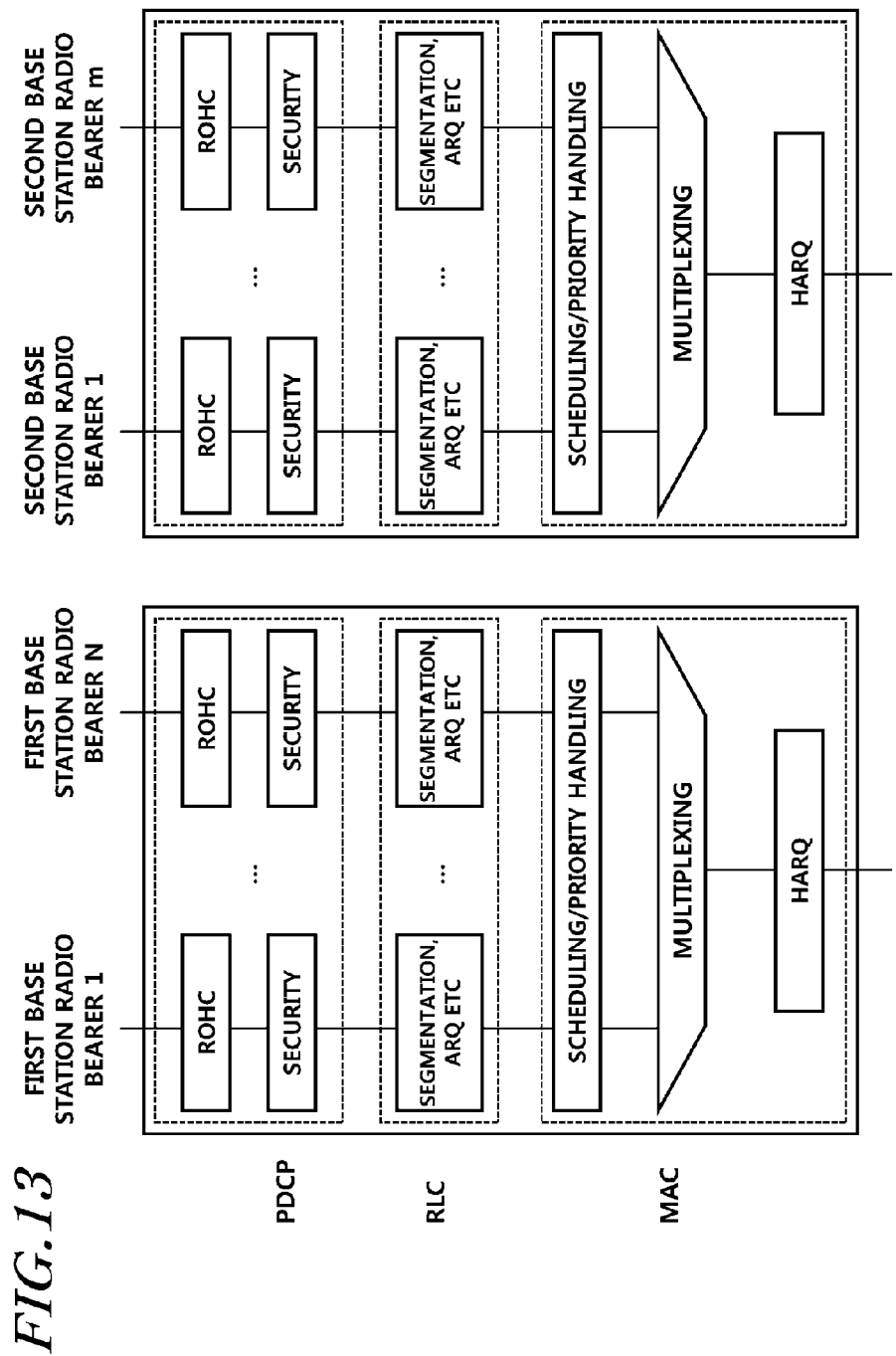
FIG. 13 is a view illustrating another example of a Layer 2 structure of a first base station and a second base station according to the present invention.

FIG. 13 is a view illustrating another example of a Layer 2 structure of a first BS and a second BS according to the present invention.

FIG. 13 specifically illustrates a Layer 2 protocol structure of a first BS and a second BS in a case where the user data transmission model of FIG. 3 is used.

Referring to FIG. 13, a PDCP entity of the first BS delivers user data through the first BS in the unit of radio bearer, and is distinguished from a PDCP entity of the second BS that delivers user data through the second BS in the unit of radio bearer, according to the above-described procedures in the present invention.

The second BS has one Hybrid Automatic Repeat reQuest (HARQ) entity for processing a cell associated with the second BS. When the first BS supports the existing CA technology, the first BS may have multiple HARQ entities. When the second BS supports the existing CA technology, the second BS may also have multiple HARQ entities.

Figure 14:
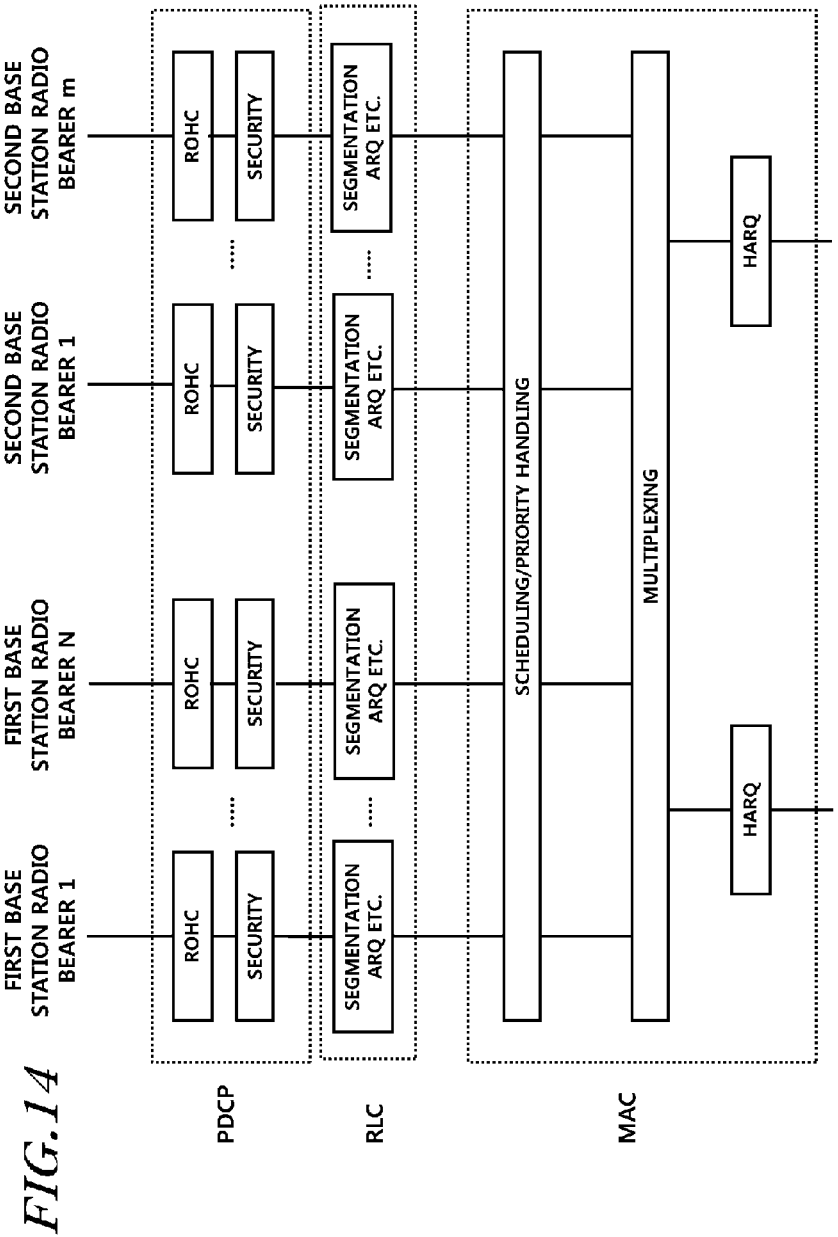
FIG. 14 is a view illustrating an example of a Layer 2 structure of a user equipment according to the present invention.

FIG. 14 is a view illustrating an example of a Layer 2 structure of a UE according to the present invention.

FIG. 14 specifically illustrates a Layer 2 protocol structure of the UE.

Referring to FIG. 14, a PDCP entity of the first BS delivers user data through the first BS in the unit of radio bearer, and is distinguished from a PDCP entity of the second BS that delivers user data through the second BS in the unit of radio bearer.

When one or more SCells or a serving cell is configured for the UE, and if the SCells or the serving cell includes a cell (small cell) associated with the second BS, MAC layer must to be capable of mapping logical channels, which belong to a radio bearer and are to be delivered through the second BS, to transport channels (e.g., Downlink Shared channels (DL-SCHs) or Uplink Shared Channels (UL-SCHs)) through the second BS. To this end, the logical channel configuration information (logicalchannelconfig) may include information capable of identifying that a cell or radio bearer is a cell (small cell) associated with the second BS or a radio bearer through the second BS. For example, the information capable of identifying that a cell is a cell (small cell) associated with the second BS may be logicalchannelgroup, a priority, cell ID information associated with the second BS, second BS cell index information, or newly-defined information (second BS radio bearer representation information). As another example, use is made of a method for discriminating between logical channel IDs (logicalChannelIds) with respect to a cell (small cell) associated with the second BS, a method for taking a mapping table and performing switching based on the discrimination made between logical channel IDs with respect to the cell associated with the second BS, or the like.

Figure 15:
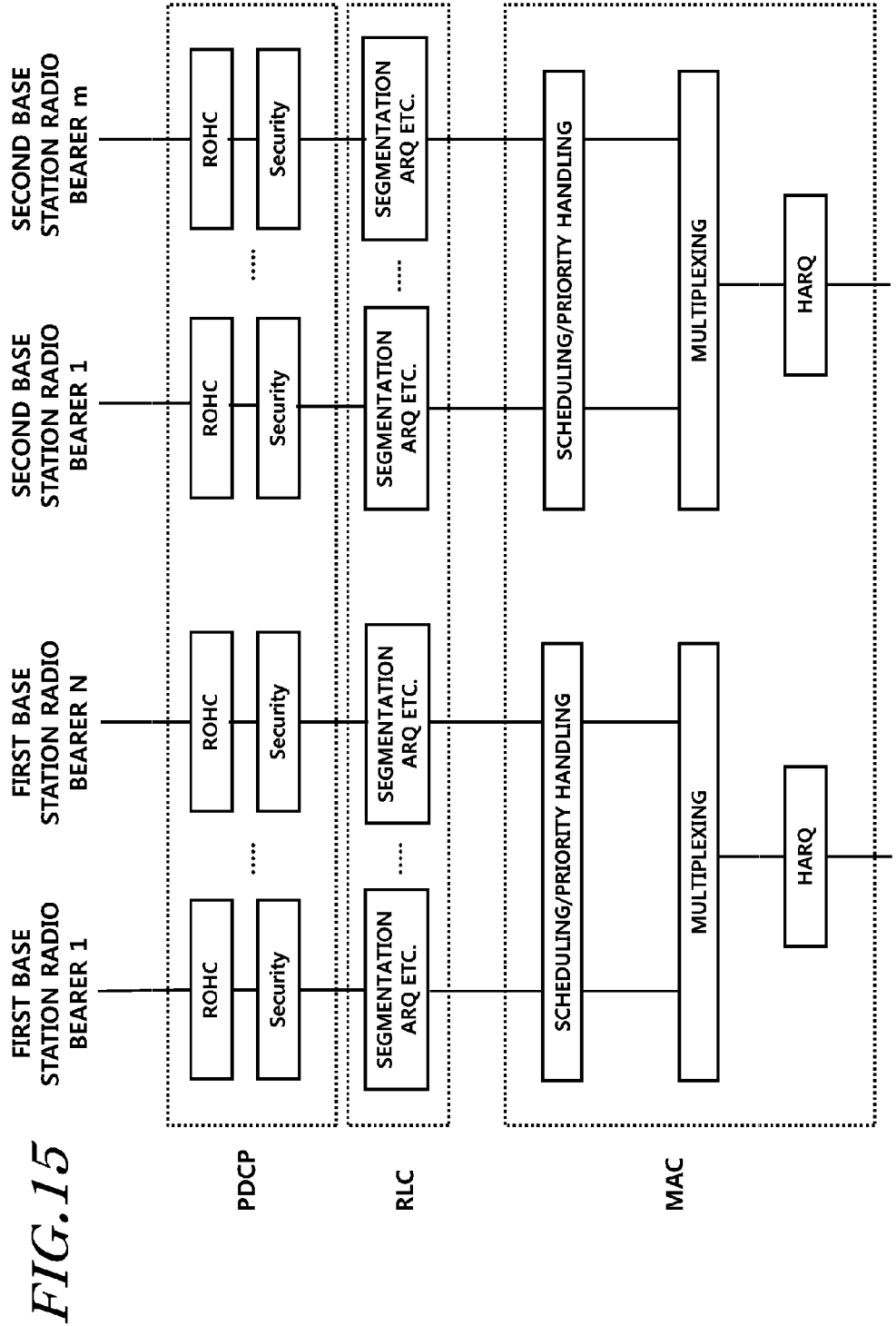
FIG. 15 is a view illustrating another example of a Layer 2 structure of a user equipment according to the present invention.

FIG. 15 is a view illustrating another example of a Layer 2 structure of a UE according to the present invention.

FIG. 15 specifically illustrates a Layer 2 protocol structure of the UE implemented in a method distinguished from that illustrated in FIG. 14.

Referring to FIG. 15, in an MAC layer, an MAC layer (entity) for the first BS is separated from an MAC layer (entity) for the second BS.

Specifically, the UE may have a scheduling/priority handling entity for the first BS, a multiplexing entity for the first BS, and a HARQ entity for the first BS, a scheduling/priority handling entity for the second BS, a multiplexing entity for the second BS, and a HARQ entity for the second BS. Accordingly, when one or more SCells or a serving cell is configured for the UE, if the SCells or the serving cell includes a cell (small cell) associated with the second BS, a second BS MAC entity may map logical channels, which belong to a radio bearer and are to be delivered through the second BS, to transport channels (e.g., Downlink Shared channels (DL-SCHs) or Uplink Shared Channels (UL-SCHs)) through the second BS. To this end, the logical channel configuration information (logicalchannelconfig) may include information for identifying that a cell or radio bearer is a cell (small cell) associated with the second BS or a radio bearer through the second BS. For example, the information for identifying that a cell is a cell (small cell) associated with the second BS may be logicalchannelgroup, a priority, cell ID information associated with the second BS, second BS cell index information, or newly-defined information (second BS radio bearer representation information).

It should be noted that the UDP protocol illustrated in FIG. 10 and FIG. 11 may be changed to a Stream Control Transmission Protocol (SCTP).

Figure 16:
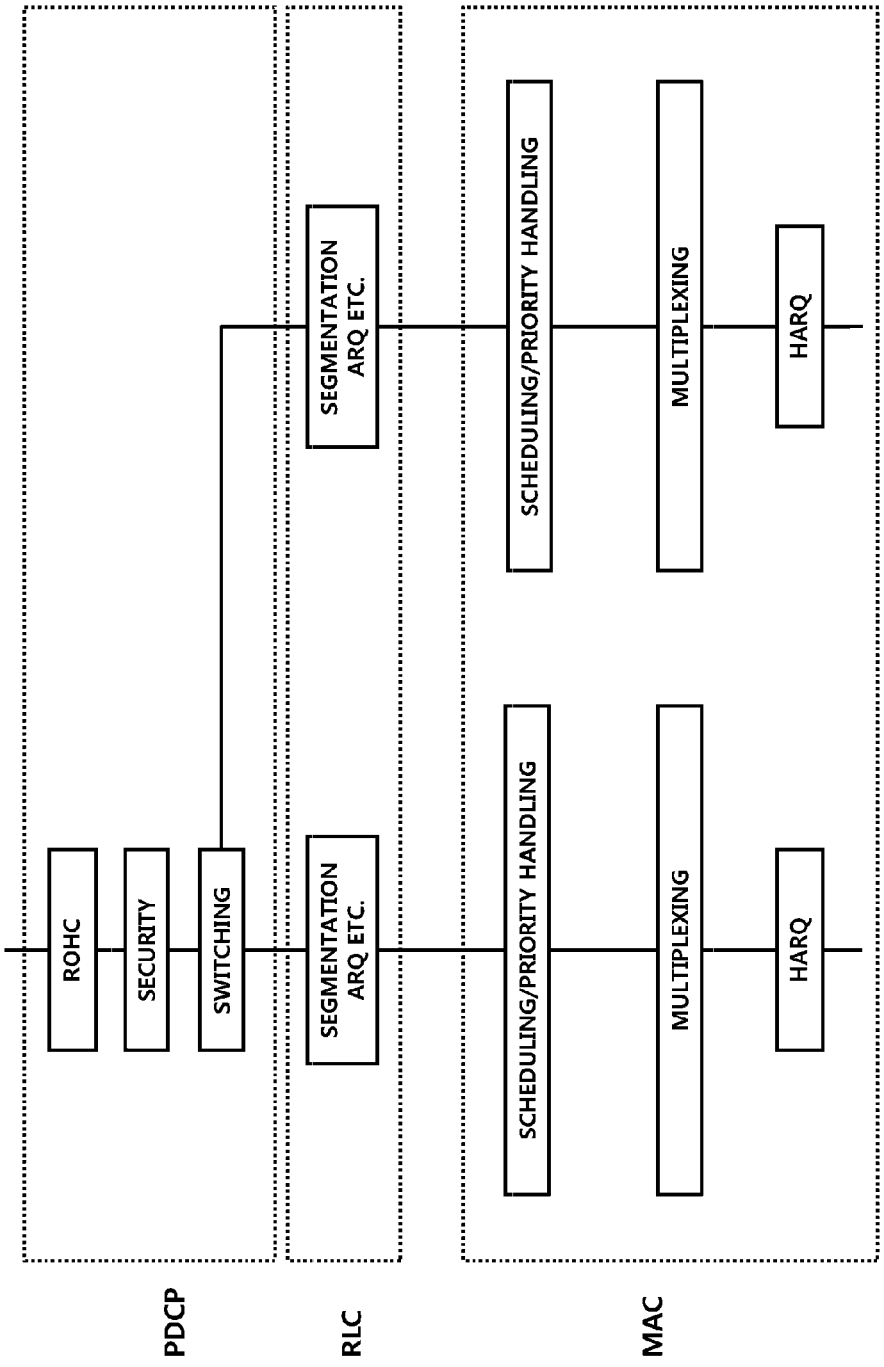
FIG. 16 is a view illustrating still another example of a Layer 2 structure of a user equipment according to the present invention.

FIG. 16 is a view illustrating still another example of a Layer 2 structure of a UE according to the present invention.

FIG. 16 specifically illustrates a Layer 2 protocol structure of the UE implemented in a method distinguished from those illustrated n FIGS. 14 and 15.

Referring to FIG. 16, in order to transmit user plane data through the first BS and the second BS with respect to one radio bearer (in an MAC), an MAC layer (entity) for the first BS is separated from an MAC layer (entity) for the second BS, and the MAC layer (entity) for the first BS and the MAC layer (entity) for the second BS are provided twice.

Specifically, the UE may have a scheduling/priority handling entity for the first BS, a multiplexing entity for the first BS, a HARQ entity for the first BS, and an RLC entity for the first BS, a scheduling/priority handling entity for the second BS, a multiplexing entity for the second BS, a HARQ entity for the second BS, and an RLC entity for the second BS.

In a PDCP layer, the UE may have an entity that classifies data according to the first BS RLC layer and the second BS RLC layer, and switches between data of the first BS RLC layer and data of the second BS RLC layer.

Configurations of a BS and a UE for which the overall invention described hereinabove can be performed will be described with reference to FIGS. 17 and 18.

The methods according to the present invention as described with reference to FIGS. 4 to 9 may be implemented by a BS and a UE described below.

Figure 17:
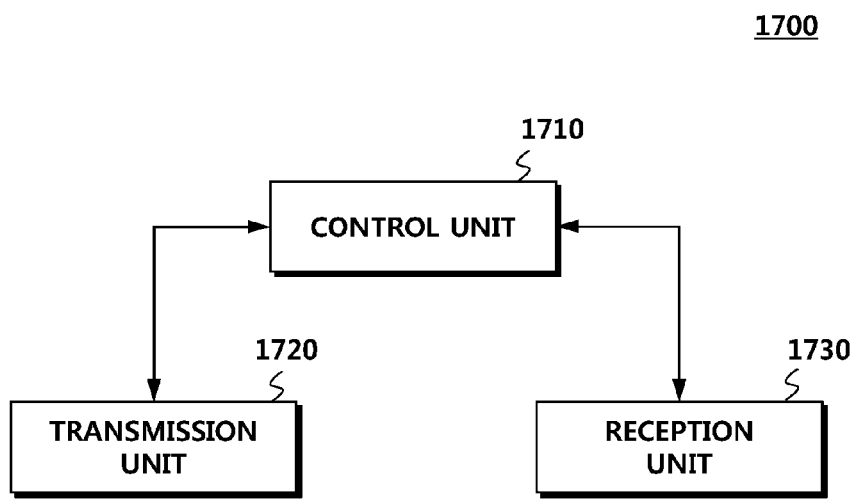
FIG. 17 is a view illustrating a configuration of a base station according to still another embodiment of the present invention.

FIG. 17 is a view illustrating a configuration of a BS 1700 according to still another embodiment of the present invention.

Referring to FIG. 17, the BS 1700 includes a control unit 1710, a transmission unit 1720, and a reception unit 1730.

The control unit 1710 controls an overall operation of the BS 1700 according to the control of the method for transmitting user plane data through a second BS (not shown) under the control of the first BS 1700 required to perform the above-described invention.

The transmission unit 1720 and the reception unit 1730 are used to transmit and receive a signal, a message, and data required to perform the above-described invention to/from a UE (not shown).

Specifically, the control unit 1710 may select a radio bearer configured through the second BS on the basis of at least one of measurement reporting information and data load information of the first BS 1700, and may determine the transmission of user plane data.

When the transmission of user plane data has been determined, the transmission unit 1720 may transmit a bearer establishment request message to the second BS.

The bearer establishment request message may include at least one of first BS UE X2AP ID information, cell ID information associated with the second BS, second BS cell index information, a UE-AMBR, and E-RABs setup list information.

Also, the transmission unit 1720 may transmit, to the second BS according to another embodiment of the present invention, a secondary cell addition modification request message including at least one of message type information, second BS ID information, cell ID information associated with the second BS, and second BS cell index information.

The transmission unit 1720 may transmit, to the UE, higher layer signaling including at least one of cell ID information of a cell associated with the second BS, second BS cell index information, and DRB information configured through the second BS. Further, the higher layer signaling may further include at least one of second BS cell system information, second BS dedicated MAC layer configuration information, and a random access channel preamble of a second BS cell.

The DRB information configured through the second BS may include at least one of information that allows the UE to distinguish the first BS 1700 from the second BS in an MAC layer, and information that allows the UE to distinguish a cell provided by the first BS from a cell provided by the second BS in the MAC layer.

The reception unit 1730 may receive a bearer establishment response message from the second BS.

The bearer establishment response message may include at least one of cell ID information associated with the second BS, second BS cell index information, random access channel preamble information of a second BS cell, second BS cell system information, second BS cell dedicated MAC layer configuration information, E-RABs admitted list information, and second BS DRB configuration information on the admitted E-RAB.

Also, the reception unit 1730 may receive, from the second BS, a secondary cell addition modification response message including at least one of cell ID information associated with the second BS, second BS cell index information, random access channel preamble information of the second BS cell, and second BS cell radio resource configuration information.

Figure 18:
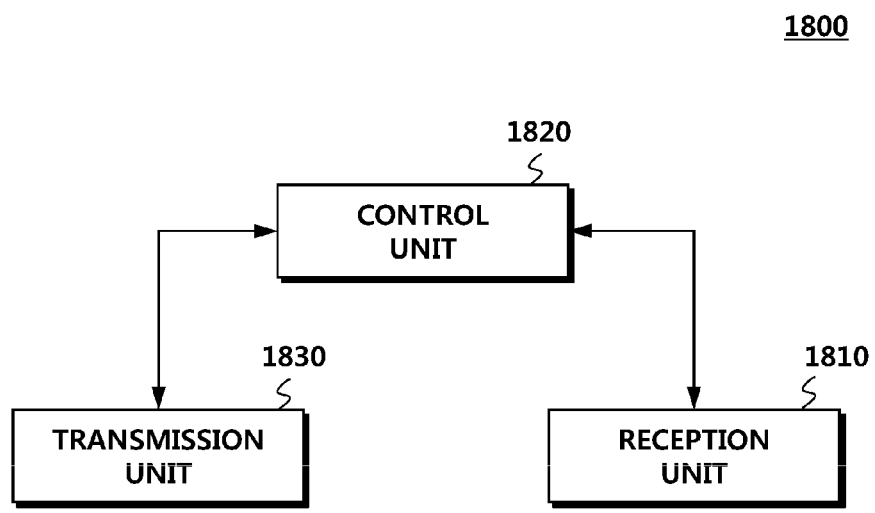
FIG. 18 is a view illustrating a configuration of a user equipment according to still another embodiment of the present invention.

FIG. 18 is a view illustrating a configuration of a UE 1800 according to still another embodiment of the present invention.

Referring to FIG. 18, the UE 1800 includes a reception unit 1810, a control unit 1820, and a transmission unit 1830.

The control unit 1820 controls an overall operation of the UE 1800 according to the transmission of user plane data through a second BS (not shown) under the control of a first BS (not shown) required to perform the above-described invention.

The reception unit 1810 receives DL control information, data, and a message from the first BS or the second BS through a relevant channel.

The transmission unit 1830 transmits DL control information, data, and a message to the first BS or the second BS through a relevant channel.

Specifically, the control unit 1820 may perform a control operation for adding or modifying a cell associated with the second BS and configuring a DRB for transmitting user plane data, based on higher layer signaling received from the first BS.

Also, the control unit 1820 may control an overall operation of the UE 1800 related to the execution of a random access procedure for UL synchronization with the cell associated with the second BS.

Further, the control unit 1820 may perform a control operation for configuring an MAC entity for the first BS and an MAC entity for the second BS in such a manner as to distinguish the MAC entity for the first BS from the MAC entity for the second BS in an MAC layer. The MAC entity for the second BS may be configured in such a manner as to discriminate between a scheduling/priority handling entity and a multiplexing entity for a radio bearer configured through the second BS.

The reception unit 1810 may receive, from the first BS, higher layer signaling including at least one of cell ID information of a cell associated with the second BS, second BS cell index information, and DRB information configured through the second BS.

Also, the reception unit 1810 may receive higher layer signaling further including at least one of cell identification information associated with the second BS which allows the UE 1800 to access a cell associated with the second BS, second BS cell system information, random access channel preamble information of a second BS cell, and UE-specific configuration information.

The DRB information configured through the second BS may include at least one of information that allows the UE 1800 to distinguish the first BS from the second BS in an MAC layer, and information that allows the UE 1800 to distinguish a cell provided by the first BS from a cell provided by the second BS in the MAC layer.

The transmission unit 1830 may transmit user plane data to the second BS through a DRB.

As described hereinabove, when the present invention is applied, the method and the apparatus are provided in which a UE adds/modifies a cell associated with a second BS or a DRB in order to transmit user plane data through the second BS.

Also, when the present invention is applied, the method and the apparatus are provided in which a first BS controls a procedure, such as a procedure for adding/modifying the cell (small cell) associated with the second BS by the UE, a procedure for adding/modifying a radio bearer, which is to be configured in the cell (small cell) associated with the second BS, by the UE, or the like.

Although preferred embodiments of the present invention have been described for illustrative purposes, those skilled in the art will appreciate that various modifications, additions, and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiments. The scope of the present invention shall be construed on the basis of the accompanying claims in such a manner that all of the technical ideas included within the scope equivalent to the claims belong to the present invention.

The invention claimed is:

1. A method of controlling transmission of user plane data of a user equipment by a first base station, the method comprising:
    selecting, by the first base station, a radio bearer to be configured through a second base station, based on at least both load information of the first base station and measurement report information;
    determining, by the first base station, the transmission of the user plane data through the second base station;
    transmitting a bearer establishment request message to the second base station;
    receiving a bearer establishment response message from the second base station, wherein the bearer establishment response message includes at least one of a cell IDentifier (ID) information of a cell associated with the second base station and second base station cell index information; and
    transmitting, to the user equipment, higher layer signaling including at least one of the cell ID information of the cell associated with the second base station, the second base station cell index information, and Data Radio Bearer (DRB) information configured through the second base station such that the user equipment transmits the user plane data through the second base station based on the higher layer signaling,
    wherein the DRB information comprises at least one of information that allows the user equipment to distinguish the first base station from the second base station in a medium access control (MAC) layer, and information that allows the user equipment to distinguish a cell provided by the first base station from a cell provided by the second base station in the MAC layer.

2. The method as claimed in claim 1, wherein the bearer establishment request message comprises at least one of first base station user equipment X2 Application Protocol (X2AP) ID information, cell ID information associated with the second base station, second base station cell index information, a user equipment Aggregate Maximum Bit Rate (UE-AMBR), and Evolved Universal Terrestrial Radio Access Network (E-UTRAN) Radio Access Bearers (E-RABs) setup list information.

3. The method as claimed in claim 1, wherein the bearer establishment response message further comprises at least one of random access channel preamble information of a second base station cell, second base station cell system information, second base station cell dedicated MAC layer configuration information, Evolved Universal Terrestrial Radio Access Network Radio Access Bearers (E-RABs) admitted list information, and second base station DRB configuration information on the admitted E-RAB.

4. The method as claimed in claim 1, wherein the higher layer signaling further comprises at least one of second base station cell system information, second base station dedicated MAC layer configuration information, and a random access channel preamble of a second base station cell.

5. The method as claimed in claim 1, wherein the second base station cell index information and the DRB information configured through the second base station are information that the second base station establishes and transmits to the first base station.

6. A method of controlling transmission of user plane data by a user equipment, the method comprising:
    receiving, from a first base station, higher layer signaling including at least one of cell IDentifier (ID) information of a cell associated with a second base station, second base station cell index information, and Data Radio Bearer (DRB) information configured through the second base station; and
    adding or modifying the cell associated with the second base station and configuring a DRB for transmitting the user plane data based on the higher layer signaling,
    wherein the first base station is configured to:
    select a radio bearer to be configured through the second base station, based on at least both load information of the first base station and measurement report information;
    determine the transmission of the user plane data through the second base station;
    transmit a bearer establishment request message to the second base station;
    receive a bearer establishment response message from the second base station, wherein the bearer establishment response message includes at least one of the cell ID information of the cell associated with the second base station and the second base station cell index information; and
    transmit, to the user equipment, the higher layer signaling; and
    wherein the DRB information comprises at least one of information that allows the user equipment to distinguish the first base station from the second base station in a medium access control (MAC) layer, and information that allows the user equipment to distinguish a cell provided by the first base station from a cell provided by the second base station in the MAC layer.

7. The method as claimed in claim 6, wherein the configuring of the DRB comprises configuring the DRB to distinguish a MAC entity of the first base station from an MAC entity of the second base station.

8. The method as claimed in claim 7, wherein the MAC entity for the second base station is configured to discriminate between (i) an entity configured to perform at least one of a scheduling operation and a priority handling operation and (ii) a multiplexing entity for a radio bearer configured through the second base station.

9. The method as claimed in claim 6, wherein the higher layer signaling further comprises at least one of second base station cell system information, second base station dedicated a MAC layer configuration information, and a random access channel preamble of a second base station cell.

10. A user equipment for controlling transmission of user plane data, the user equipment comprising:
- a receiver configured to receive, from a first base station, higher layer signaling including at least one of cell IDentifier (ID) information of a cell associated with a second base station, second base station cell index information, and Data Radio Bearer (DRB) information configured through the second base station; and
- a controller configured to add or modify the cell associated with the second base station and to perform configuration of the DRB for transmitting the user plane data based on the higher layer signaling,
- wherein the first base station is configured to:
- select a radio bearer to be configured through the second base station, based on at least both load information of the first base station and measurement report information;
- determine the transmission of the user plane data through the second base station;
- transmit a bearer establishment request message to the second base station;
- receive a bearer establishment response message from the second base station, wherein the bearer establishment response message includes at least one of the cell ID information of the cell associated with the second base station and the second base station cell index information; and
- transmit, to the user equipment, the higher layer signaling; and
- wherein the DRB information comprises at least one of information that allows the user equipment to distinguish the first base station from the second base station in a medium access control (MAC) layer, and information that allows the user equipment to distinguish a cell provided by the first base station from a cell provided by the second base station in the MAC layer.

11. The user equipment as claimed in claim 10, wherein the controller configures the DRB in such a manner as to distinguish a MAC entity for the first base station from an MAC entity for the second base station.

12. The user equipment as claimed in claim 11, wherein the MAC entity for the second base station is configured in such a manner as to discriminate between (i) an entity configured to perform at least one of a scheduling operation and a priority handling operation and (ii) a multiplexing entity for a radio bearer configured through the second base station.

* * * * *